United States Patent
Nomura et al.

(10) Patent No.: US 10,210,419 B2
(45) Date of Patent: Feb. 19, 2019

(54) CONVOLUTION OPERATION APPARATUS

(71) Applicant: CANON KABUSHIKI KAISHA, Tokyo (JP)

(72) Inventors: Osamu Nomura, Yokohama (JP); Takahisa Yamamoto, Kawasaki (JP); Masami Kato, Sagamihara (JP); Yoshinori Ito, Tokyo (JP); Katsuhiko Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 15/331,044

(22) Filed: Oct. 21, 2016

(65) Prior Publication Data

US 2017/0116495 A1    Apr. 27, 2017

(30) Foreign Application Priority Data

Oct. 21, 2015 (JP) .................................. 2015-207499

(51) Int. Cl.
*G06K 9/00* (2006.01)
*G06K 9/46* (2006.01)
(Continued)

(52) U.S. Cl.
CPC ............. *G06K 9/46* (2013.01); *G06F 17/153* (2013.01); *G06K 9/00986* (2013.01);
(Continued)

(58) Field of Classification Search
None
See application file for complete search history.

(56) References Cited

U.S. PATENT DOCUMENTS 4,328,426 A * 5/1982 D'Ortenzio ............ G03G 15/00
250/208.1
4,694,407 A * 9/1987 Ogden .................. G06T 11/001
345/440
(Continued)

FOREIGN PATENT DOCUMENTS

JP   H10-21405 A     1/1998
JP   5376920 B2    12/2013

OTHER PUBLICATIONS

Denton et al., "Exploiting Linear Structure Within Convolutional Networks for Efficient Evaluation", Dept. of Computer Science, Courant Institute, New York University, arXiv:1404.07.6v2[cs.CV], Jun. 9, 2014, pp. 1-11.

*Primary Examiner* — Mark Roz
(74) *Attorney, Agent, or Firm* — Carter, Deluca, Farrell & Schmidt, LLP

(57) ABSTRACT

There is provided with a convolution operation apparatus. A first product-sum calculator includes a plurality of first multipliers, a plurality of first accumulators, a first data supplier which supplies first data to the plurality of first multipliers, and a second data supplier which supplies a plurality of second data to the plurality of first multipliers. A second product-sum calculator includes a plurality of second multipliers, a plurality of second accumulators, a third data supplier which supplies third data to the plurality of second multipliers, and a fourth data supplier which receives and holds an output from each of the plurality of first accumulators and supply the outputs as fourth data to a corresponding one of the plurality of second multipliers.

12 Claims, 22 Drawing Sheets

(51) Int. Cl.
*G06N 3/08* (2006.01)
*G06F 17/15* (2006.01)
*G06N 3/04* (2006.01)

(52) U.S. Cl.
CPC ......... *G06K 9/4628* (2013.01); *G06N 3/0454* (2013.01); *G06N 3/08* (2013.01)

(56) References Cited

U.S. PATENT DOCUMENTS

| | | | |
|---|---|---|---|
| 6,125,212 A * | 9/2000 | Kresch | G06T 5/10 382/248 |
| 6,185,336 B1 * | 2/2001 | Clark | H04N 1/40062 358/1.9 |
| 6,304,679 B1 * | 10/2001 | Clingerman | G06T 5/20 382/260 |
| 8,885,930 B2 | 11/2014 | Yamamoto et al. | |
| 9,147,130 B2 | 9/2015 | Saruta et al. | |
| 2012/0303932 A1 | 11/2012 | Farabet et al. | |
| 2014/0297989 A1 | 10/2014 | Honjo et al. | |
| 2015/0286892 A1 | 10/2015 | Ohno et al. | |
| 2016/0012277 A1 | 1/2016 | Tate et al. | |

* cited by examiner

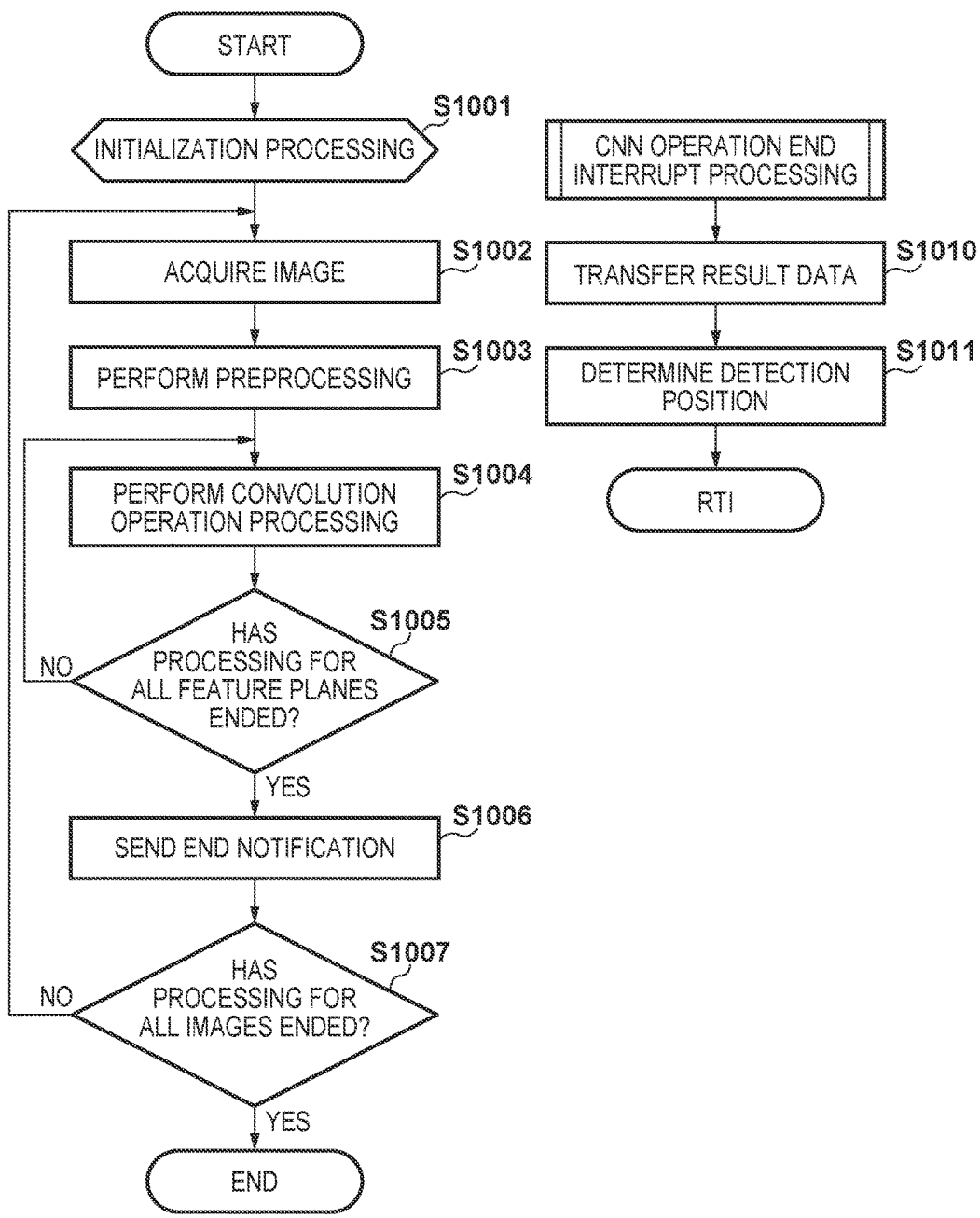

CONVOLUTION OPERATION APPARATUS

BACKGROUND OF THE INVENTION

Field of the Invention

The present invention relates to a convolution operation apparatus.

Description of the Related Art

An apparatus which applies a neural network technique has been widely proposed as a pattern recognition apparatus. Especially, among neural networks, an operation processing method called convolutional neural networks (to be referred to as CNNs hereinafter) is known as a method of allowing pattern recognition robust against variations of a recognition target. As an example in which such method is applied, Japanese Patent Laid-Open No. 10-021406 proposes a technique of performing face recognition using image data.

An example of a CNN operation will now be described.

FIG. 23 is a block diagram showing an example in which a CNN operation for image data is implemented by neural networks.

Since FIG. 23 shows a case in which a CNN operation is performed for image data, an input layer 2301 is raster-scanned image data of a predetermined size. Feature planes 2303a to 2303c indicate feature planes in a first layer 2308. The feature plane is a data plane indicating the detection result of a predetermined feature extraction filter (convolution operation and non-linear processing). If, for example, a face is detected, the feature plane is a data plane indicating a detection result of eyes, a mouth, a nose, or the like. Since this data plane indicates the detection result of feature extraction for the image data obtained by a raster scan, the detection result is also expressed by a plane. Each of the feature planes 2303a to 2303c is generated by performing a convolution operation and non-linear processing for the input layer 2301. For example, the feature plane 2303a is obtained by performing a convolution operation schematically represented by a kernel 2311a, and performing non-linear transformation for the operation result. Note that kernels 2311b and 2311c of the filter shown in FIG. 23 are used to generate the feature planes 2303b and 2303c, respectively. Feature planes 2305a and 2305b indicate feature planes in a second layer 2309, and a feature plane 2307 indicates a feature plane in a third layer 2310.

FIG. 24 is a view showing an example of a kernel 2442 of a convolution filter.

Referring to FIG. 24, a data string 2441 is a data string indicating the reference pixels of image data obtained by a raster scan, and the kernel 2442 of the filter indicates an example of a kernel for the reference pixels. This example corresponds to execution of an FIR (Finite Impulse Response) filter operation using the kernel having a size of 5×5. The FIR filter operation is processed by a product-sum calculation given by:

$$\text{output}(x, y) = \sum_{row=0}^{rowSize-1} \sum_{column=0}^{columnSize-1} (\text{input}(x + \text{column}, y + \text{row}) \times \text{weight} \qquad (1)$$

$$(\text{column, row}))$$

where "input(x, y)" represents a reference pixel value at coordinates (x, y), "output(x, y)" represents an FIR filter operation result at the coordinates (x, y), "weight(column, row)" represents an FIR filter coefficient at coordinates (x+column, y+row), and "columnSize" and "rowSize" represent the sizes of the kernel, which are 5 in the example of FIG. 24.

When calculating the feature plane 2303a shown in FIG. 23, the data string 2441 corresponds to the input layer 2301, and the kernel 2442 corresponds to the kernel 2311a. In a CNN operation, a product-sum calculation is repeated while scanning the kernels of a plurality of filters for respective pixels, thereby obtaining a final product-sum result. A feature plane is then generated by further performing non-linear transformation for the product-sum result. Note that when calculating the feature plane 2303a, the number of connections to the previous layer is "1", and thus the number of kernels is 1.

An operation of generating the feature plane 2305a in the second layer 2309 will be described next.

The feature plane 2305a is connected to the three feature planes 2303a to 2303c in the previous first layer 2308. Therefore, when calculating data of the feature plane 2305a, a filter operation is performed for the feature plane 2303a using a kernel schematically indicated by a kernel 2312a, and the result is held in an accumulator. Similarly, a filter operation using a kernel 2313a and that using a kernel 2314a are performed for the feature planes 2303b and 2303c, respectively, and the results are accumulated in the accumulator. After the end of these three kinds of filter operations, non-linear transformation processing is performed using a logistic function or hyperbolic function (tank function). By performing the above processing for the entire image while scanning pixels one by one, the feature plane 2305a is generated.

Similarly, when generating the feature plane 2305b, three convolution filter operations are performed using kernels 2312b, 2313b, and 2314b for the feature planes 2303a to 2303c in the previous layer 2308. When generating the feature plane 2307 in the third layer 2310, two convolution filter operations are performed using kernels 2315 and 2316 for the feature planes 2305a and 2305b in the previous layer 2309. Note that respective filter coefficients have been determined in advance by learning using a general method such as back propagation learning or deep learning. In, for example, detection or recognition of an object, a kernel of a size of 10×10 or larger is often used.

In CNN operation processing, a number of filters of large kernel sizes are hierarchically used, thereby requiring an enormous number of convolution operations. As a method of coping with this problem, for example, a technique of reducing the number of times of execution of a product-sum calculation in a convolution operation by decomposing filter coefficients into one-dimensional base filter coefficients is proposed in Denton et al. "Exploiting Linear Structure Within Convolutional Networks for Efficient Evaluation", CoRR2014 (Hereinafter referred to as Denton).

On the other hand, if a convolution operation in CNNs is implemented as software operating on a processor, the number of convolution operations is enormous, as described above. Thus, a desired operation speed may be difficult to achieve. As a method of coping with this problem, for example, U.S. Patent Application Publication No. 2012/0303932 proposes a technique of implementing a CNN operation by digital hardware.

SUMMARY OF THE INVENTION

According to an embodiment of the present invention, a convolution operation apparatus comprises: a first product-sum calculator including: a plurality of first multipliers each configured to multiply data input to a first input and a second input; a plurality of first accumulators each configured to accumulate a multiplication result from a corresponding one of the plurality of first multipliers; a first data supplier configured to supply first data to the first input of each of the plurality of first multipliers; and a second data supplier configured to supply a plurality of second data to respective second inputs of the plurality of first multipliers; a second product-sum calculator including: a plurality of second multipliers each configured to multiply data input to a first input and a second input; a plurality of second accumulators each configured to accumulate a multiplication result from a corresponding one of the plurality of second multipliers; a third data supplier configured to supply third data to the first input of each of the plurality of second multipliers; and a fourth data supplier configured to receive and hold an output from each of the plurality of first accumulators and supply the output as fourth data to the second input of a corresponding one of the plurality of second multipliers; and a controller configured to control the first product-sum calculator and the second product-sum calculator to parallelly execute product-sum processing, wherein the second product-sum calculator provides the outputs from the plurality of second accumulators as results of convolution operations to the second data using the first data and the third data.

According to another embodiment of the present invention, a convolution operation apparatus comprises: a first product-sum calculator including: a plurality of first multipliers each configured to multiply data input to a first input and a second input; a plurality of first accumulators each configured to accumulate a multiplication result from a corresponding one of the plurality of first multipliers; a first data supplier configured to supply first data to the first input of each of the plurality of first multipliers; and a second data supplier configured to supply a plurality of second data to respective second inputs of the plurality of first multipliers; and a second product-sum calculator including: a plurality of second multipliers each configured to multiply data input to a first input and a second input, a plurality of second accumulators each configured to accumulate a multiplication result from a corresponding one of the plurality of second multipliers; a third data supplier configured to supply third data to the first input of each of the plurality of second multipliers; and a fourth data supplier configured to supply fourth data to the second input of a corresponding one of the plurality of second multipliers; and a controller configured to control the first product-sum calculator and the second product-sum calculator, wherein the first product-sum calculator is subsequently connected to the second product-sum calculator, the fourth data supplier is further configured to loads necessary reference data into ring buffers at once for each filter kernel, shift the loaded reference data in a ring in response to an operation clock, and supply the shifted reference data as the fourth data, and the second data supplier supplies, as the plurality of second data, outputs from the plurality of second accumulators to the second inputs of the plurality of first multipliers.

Further features of the present invention will become apparent from the following description of exemplary embodiments (with reference to the attached drawings).

BRIEF DESCRIPTION OF THE DRAWINGS

FIG. 10A is a flowchart for explaining the operation of the object detection apparatus according to the first embodiment;

FIG. 10B is a flowchart for explaining processing which is executed by a CPU in response to an end notification interrupt from the CNN processing unit;

FIGS. 16A to 16C are schematic views for explaining the timing of an pipeline operation of product-sum calculation processing by the first product-sum calculation circuit and product-sum calculation processing by the second product-sum calculation circuit according to the first and second embodiments;

DESCRIPTION OF THE EMBODIMENTS

When an enormous number of convolution operations are required like a CNN operation, it is effective to execute a convolution operation by decomposing filter coefficients into lower-dimensional filter coefficients, as a method of reducing the operation amount. When executing an enormous number of convolution operations, it is more effective to adopt digital hardware than software operating on a processor in terms of increasing the speed and reducing the power consumption. However, the arrangement of digital hardware capable of efficiently executing an operation when executing a convolution operation by decomposing filter coefficients into lower-dimensional filter coefficients has not been proposed.

An embodiment of the present invention provides a convolution operation apparatus which can implement efficient convolution operation processing.

Embodiments of the present invention will be described in detail below with reference to the accompanying drawings. Note that the following embodiments are not intended to limit the claims of the present invention, and not all of the combinations of features described in the following embodiments are necessarily required in the present invention.

First Embodiment

The first embodiment of the present invention will be described first.

Figure 1:
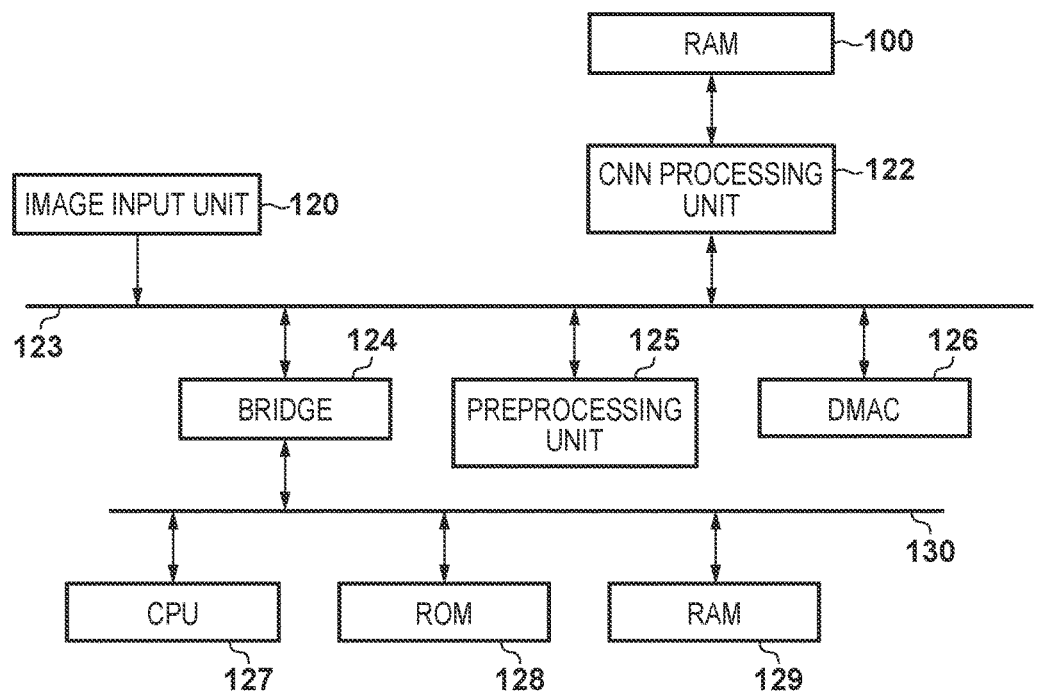
FIG. 1 is a block diagram showing the arrangement of an object detection apparatus including a hierarchical convolution operation circuit according to the first embodiment of the present invention.

FIG. 1 is a block diagram showing the arrangement of an object detection apparatus including a hierarchical convolution operation circuit according to the first embodiment of the present invention. This object detection apparatus (object recognition apparatus) has a function of performing a two-dimensional convolution operation and detecting a specific object from image data.

The object detection apparatus (object recognition apparatus) includes an image input unit 120, a CNN processing unit 122, a bridge 124, a preprocessing unit 125, a DMAC (Direct Memory Access Controller) 126, and a RAM 100. Furthermore, a CPU (Central Processing Unit) 127, a ROM 128, and a RAM 129 are provided. The image input unit 120, the CNN processing unit 122, the preprocessing unit 125, and the DMAC 126 are interconnected via an image bus 123, and the CPU 127, the ROM 128, and the RAM 129 are interconnected via a CPU bus 130. The bridge 124 allows data transfer between the image bus 123 and the CPU bus 130.

The image input unit 120 includes an optical system and a photoelectric conversion device such as a CCD (Charge-Coupled Device) or CMOS (Complementary Metal Oxide semiconductor) sensor. In addition, a driver circuit for controlling the sensor, an AD converter, a signal processing circuit for controlling various image correction processes, a frame buffer, and the like are provided. The CNN processing unit 122 functions as a hierarchical convolution operation circuit. The RAM 100 is used as an operation work buffer of the CNN processing unit 122 to temporarily hold various data. Note that details such as the arrangement of the CNN processing unit 122 will be described later with reference to FIG. 2. The preprocessing unit 125 performs various preprocesses for effectively executing detection processing by a CNN operation. For example, image data transformation processing such as color transformation processing and contrast correction processing is processed by hardware. The DMAC 126 controls data transfer between the CPU bus 130 and the image input unit 120, CNN processing unit 122, and preprocessing unit 125 on the image bus 123.

The ROM (Read Only Memory) 128 stores commands (programs), parameters, and the like for defining the operation of the CPU 127. The CPU 127 controls the overall operation of the object detection apparatus by reading out these data and executing the commands. At this time, the RAM 129 is used as the work area of the CPU 127. Note that the CPU 127 can access the RAM 100 on the image bus 123 via the bridge 124.

Next, the CNN processing unit 122 will be described in detail.

Figure 2:
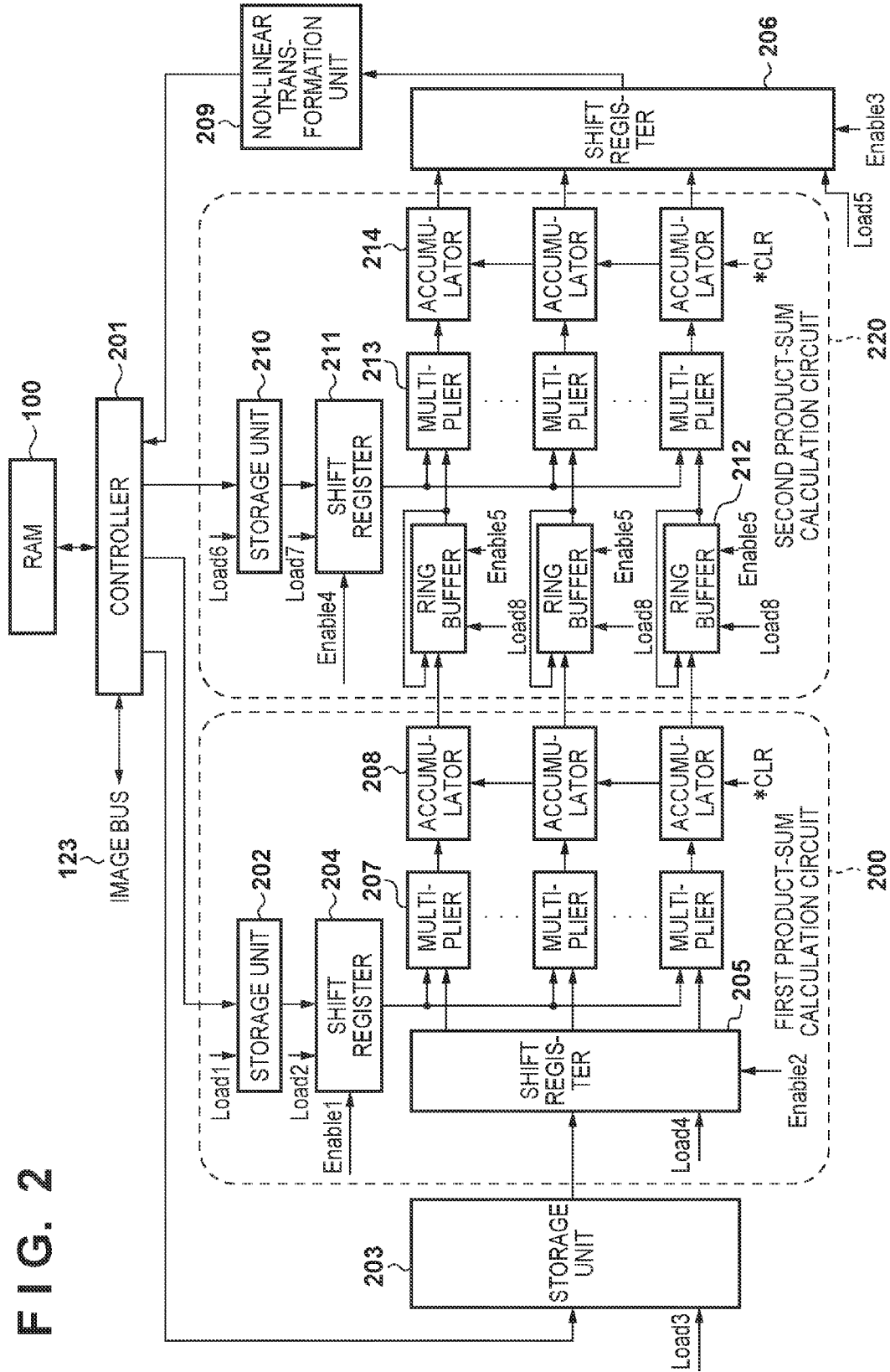
FIG. 2 is a block diagram showing the arrangement of a CNN processing unit according to the first embodiment.

FIG. 2 is a block diagram for explaining an example of the arrangement of the CNN processing unit 122 according to the first embodiment. As described above, the CNN processing unit 122 functions as a hierarchical convolution operation circuit.

The CNN processing unit 122 includes a first product-sum calculation circuit 200, a second product-sum calculation circuit 220, a controller 201 for controlling calculation processing of each product-sum calculation circuit, a storage unit 203, a shift register 206, and a non-linear transformation unit 209. The second product-sum calculation circuit 220 is subsequently series-connected to the first product-sum calculation circuit 200.

The first product-sum calculation circuit 200 includes a storage unit 202, shift registers 204 and 205, a plurality of multipliers 207 each including two inputs, and a plurality of accumulators 208. The second product-sum calculation circuit 220 includes a storage unit 210, a shift register 211, (a plurality of) ring buffers 212, a plurality of multipliers 213 each including two inputs, and a plurality of accumulators 214.

The controller 201 includes a register group for determining the basic operation of the CNN processing unit 122, a sequence controller for controlling the timings of various signals based on values set in the register group, and a memory controller for performing access arbitration to the RAM 100. Note that details such as the arrangement of the controller 201 will be described later with reference to FIG. 7.

Each of the storage unit 202 of the first product-sum calculation circuit 200 and the storage unit 210 of the second product-sum calculation circuit 220 temporarily holds weighting coefficient data output from the RAM 100. If a weighting coefficient is data represented by 8 bits, each of the storage units 202 and 210 is formed by a plurality of 8-bit registers. Each of the storage units 202 and 210 includes registers (memory capacity), the number of which is equal to or larger than a filter kernel size. For example, if the kernel size is "12", the number of registers is at least "12". That is, the storage unit can be formed by the number of registers of an assumed maximum filter size. Note that in the first embodiment, the above-described filter kernels are obtained by decomposing the coefficient data of a kernel having a two-dimensional structure into two kinds of coefficient data respectively having one-dimensional structures in the horizontal and vertical directions. The kernel having the two-dimensional structure and the kernels respectively having the one-dimensional structures will be described in detail later.

The storage unit 203 temporarily holds reference data (image data) stored in the RAM 100. If the reference data is data represented by 8 bits, the storage unit 203 is formed by a plurality of 8-bit registers. The storage unit 203 includes registers (memory capacity), the number of which is equal to or larger than "number of data (register length) parallelly processed"+"kernel size−1". The number of registers is a value necessary to obtain data to be referred to by feature plane data at positions to be processed at once (parallelly operated), and registers the number of which is equal to or larger than this value can be provided. For example, if the kernel size is "12" and the operation parallelism is "12", at least 23 (=12+11) 8-bit registers are provided.

Each of the shift registers 204 and 205 of the first product-sum calculation circuit 200, the shift register 211 of the second product-sum calculation circuit 220, and the shift register 206 has a data loading function. For example, each of the shift registers 204, 205, and 211 includes a plurality of registers having the same bit width as that of each of the storage units 202, 203, and 210, and supplies data to respective multipliers together with the ring buffers 212. The shift register 206 includes a plurality of registers each having bits, the number of which is equal to or larger than the number of significant bits of the output from each accumulator 214.

Figure 3:
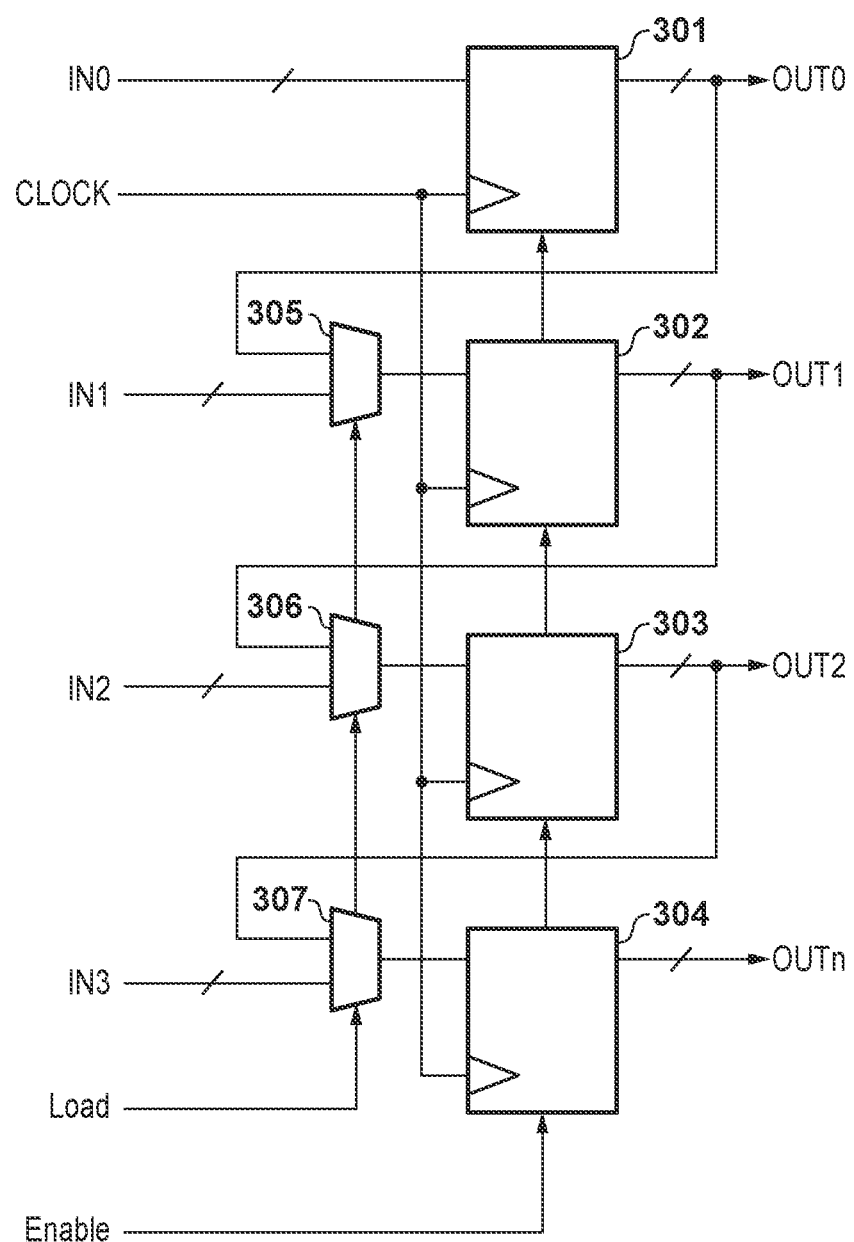
FIG. 3 is a view showing an example of the arrangement of a shift register according to the first embodiment.

FIG. 3 is a view showing an example of the arrangement of each of the shift registers 204, 205, 211, and 206 according to the first embodiment.

In this example, the shift register includes four registers (flip-flops 301 to 304 in FIG. 3). The shift register includes the four multi-bit flip-flops 301 to 304, which function as registers for latching data of a predetermined number of bits in synchronism with a CLOCK signal. An enable signal (Enable signal) is supplied to each of the flip-flops 301 to 304, and each of the flip-flops 301 to 304 latches data at the leading edge of the CLOCK signal when the Enable signal is 1 (high level). On the other hand, if the Enable signal is 0 (low level), the data latched by the previous clock is held intact. That is, no state transition occurs. Furthermore, three selectors 305 to 307 are provided. Each of these selectors 305 to 307 selects an output signal OUTx (x: 0 to 2) from the preceding flip-flop when a selection signal (Load signal) is 0 (low level), and selects an input signal INx (x: 1 to 3) when the Load signal is 1 (high level). That is, in accordance with the level of the Load signal, each of the selectors 305 to 307 selects the output from the preceding flip-flop or the input signal INx as data to be supplied to the corresponding flip-flop. In this way, this shift register performs a shift operation of the held data at the leading edge of the CLOCK signal when the selection signal (Load signal) is 0 and the Enable signal is 1.

Each of a Load2 signal, a Load4 signal, a Load7 signal, and a Load5 signal in FIG. 2 corresponds to the Load signal in FIG. 3, and each of an Enable1 signal, an Enable2 signal, an Enable4 signal, and an Enable3 signal in FIG. 2 corresponds to the Enable signal in FIG. 3. With this arrangement, even if the parallelism is high, the arrangement of a selector for selecting reference data or weighting coefficient data can be simplified, and a high-speed circuit can be built without increasing the number of wiring lines or delay.

Each ring buffer 212 shown in FIG. 2 will be described next. The ring buffer 212 has the data load function, and includes a plurality of buffers 401 each capable of holding data of bits, the number of which is equal to or larger than that of significant bits of the output from each accumulator 208 of the first product-sum calculation circuit 200.

Figure 4:
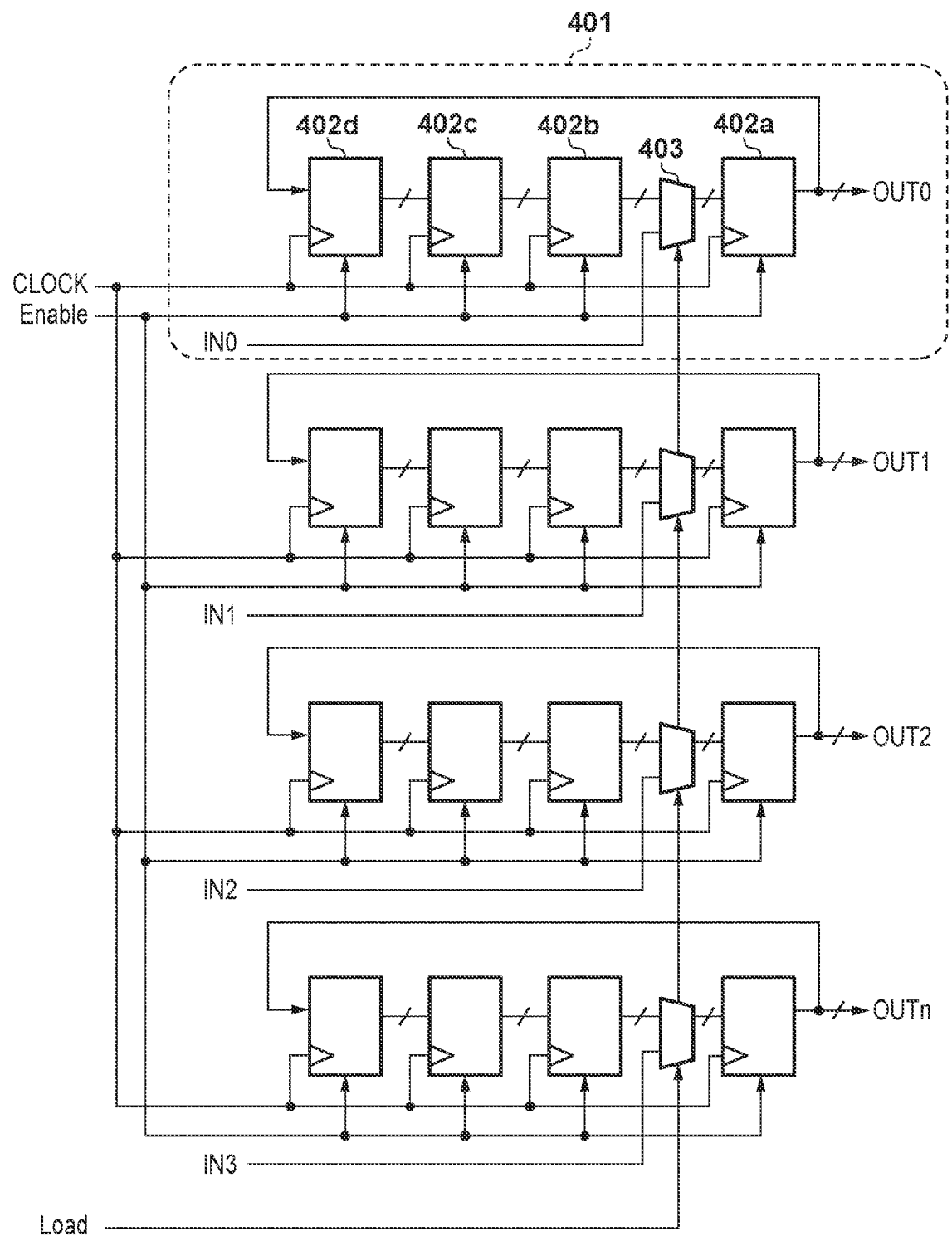
FIG. 4 is a view for explaining an example of the arrangement of a ring buffer according to the first embodiment.

FIG. 4 is a view for explaining an example of the arrangement of each ring buffer 212 according to the first embodiment. In this example, four single ring buffers 401 each having a function of performing a ring shift for data are provided in correspondence with the number of data to be held. In this example, the four single ring buffers synchronously execute the same operation in accordance with control signals. Thus, the operation of each single ring buffer 401 will be described in detail below.

Each single ring buffer 401 includes four multi-bit flip-flops 402a to 402d which latch data of a predetermined number of bits in synchronism with a CLOCK signal. Each of the flip-flops 402a to 402d is supplied with an enable signal (Enable signal), and latches data at the leading edge of the CLOCK signal when the Enable signal is 1 (high level). On the other hand, when the Enable signal is 0 (low level), the data latched by the previous clock is held intact. That is, no state transition occurs. A selector 403 is also provided.

The selector 403 selects the output signal of the flip-flop 402b when a selection signal (Load signal) is 0 (low level), and selects an input signal IN0 when the selection signal (Load signal) is 1 (high level). That is, in accordance with the level of the Load signal, the selector 403 causes the ring buffer 401 to execute a shift operation or load operation. A Load8 signal in FIG. 2 corresponds to the Load signal in FIG. 4, and an Enable5 signal in FIG. 2 corresponds to the Enable signal in FIG. 4. As is apparent from FIG. 4, the output of the flip-flop 402a is connected to the input of the flip-flop 402d. Consequently, when the Enable signal is 1 and the Load signal is 0, the data held in the single ring buffer 401 undergoes a ring shift operation in synchronism with the CLOCK signal. Note that in FIG. 4, the four single ring buffers 401 are provided, and synchronously execute the same operation in accordance with the control signals. As a result, the four data synchronously undergo the ring shift operations. Note that only the flip-flop 402a externally outputs the data held in the buffer 401. Therefore, the ring buffer 212 according to the first embodiment outputs four data at once.

Subsequently, the controller 201 loads weighting coefficient data necessary for next product-sum calculation processing from the RAM 100 into the storage unit 202 during the shift operation of the shift register 204 of the first product-sum calculation circuit 200 and that of the shift register 211 of the second product-sum calculation circuit 220. Furthermore, during the shift operation of the shift register 205, the controller 201 loads reference data necessary for the next product-sum calculation processing from the RAM 100 into the storage unit 203. After initial data are loaded (loaded from the storage unit 202 at once), the shift register 204 executes a shift operation by the number of clocks equal to each kernel size, and continuously supplies the weighting coefficient data to the respective multipliers 207. That is, the signal OUTn (the last output from the shift register 204) in FIG. 3 is commonly supplied to the first inputs of all the multipliers 207.

When the reference data are loaded from the storage unit 203, the shift register 205 executes a shift operation by the number of clocks equal to the kernel size in the column direction, and simultaneously supplies the plurality of reference data to the multipliers 207. That is, the signals OUT1 to OUTn in FIG. 3 are parallelly supplied to the second inputs of the corresponding multipliers 207, respectively. The shift registers 204 and 205 operate in synchronism with each other, and the data from the shift registers are synchronously supplied to the first and second inputs of the multipliers 207. The above processing makes it possible to perform pipeline processing of the product-sum calculation processing and data loading from the RAM 100 for each column of the filter kernel.

At the same time, similarly to the above-described shift register 204, the shift register 211 executes a shift operation by the number of clocks equal to each kernel size after the initial data are loaded (loaded from the storage unit 210 at once). This continuously supplies the weighting coefficient data to the respective multipliers 213. That is, the signal OUTn (the last output from the shift register 211) in FIG. 3 is commonly supplied to all the multipliers 213.

Upon input of data from the accumulators 208 of the first product-sum calculation circuit 200, the ring buffers 212 overwrite, based on the control signals from the controller 201, the oldest data held in the ring buffers with the input data. The ring buffers 212 simultaneously supply the input data to the multipliers 213, respectively. Before the data are input from the accumulators 208 of the first product-sum calculation circuit 200, a ring shift operation is executed the number of times obtained by subtracting 1 from the number of clocks equal to the kernel size in the vertical direction. In this way, the plurality of reference data are simultaneously supplied to the multipliers 213. That is, the signals OUT0 to OUTn in FIG. 4 are parallelly supplied to the second inputs of the corresponding multipliers 213, respectively. The ring buffers 212 and the shift register 211 synchronously operate, and data from them are supplied to the first and second inputs of the respective multipliers 213.

If each ring buffer 212 executes a ring shift operation the number of times obtained by subtracting 1 from the number of clocks equal to the kernel size in the vertical direction, data is loaded from the corresponding accumulator 208 of the first product-sum calculation circuit 200, as described above. That is, each ring buffer 212 repeats the ring shift operation the number of time obtained by subtracting 1 from the number of clocks equal to the kernel size in the vertical direction. After that, the oldest one of the data held in each ring buffer 212 is overwritten with the data input from the corresponding accumulator 208 of the first product-sum calculation circuit 200.

With the above processing, the product-sum calculation processing in the second product-sum calculation circuit 220 and loading of the weighting coefficient data from the RAM 100 can be parallelly processed for each filter kernel in the vertical direction. Furthermore, since the above-described calculation processing of the first product-sum calculation circuit 200 and that of the second product-sum calculation circuit 220 are executed in synchronism with the clock signal, it is possible to perform a pipeline operation.

Figure 5:
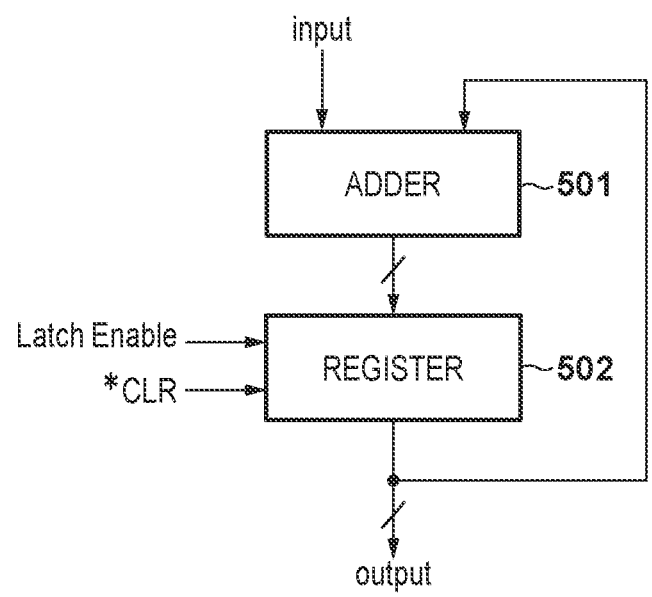
FIG. 5 is a block diagram showing an example of the arrangement of each of the accumulators of the first product-sum calculation circuit and the accumulators of the second product-sum calculation circuit according to the first embodiment.

FIG. 5 is a block diagram showing the arrangement of each accumulator 208 of the first product-sum calculation circuit 200 or each accumulator 214 of the second product-sum calculation circuit 220 according to the first embodiment. Note that the accumulators 208 and 214 have the same arrangement.

Each of the accumulators 208 and 214 includes an adder 501 and a register 502, and holds the product-sum of input data in the register 502 in accordance with a Latch Enable signal. The Latch Enable signal is a signal synchronized with the clock signal. After the end of an operation of a kernel corresponding to a target feature plane, the product-sum obtained by the accumulator 208 of the first product-sum calculation circuit 200 is loaded into the corresponding ring buffer 212, and sent to the corresponding multiplier 213 as results of convolution operations at a predetermined timing. After the end of the operation of the kernel corresponding to the target feature plane, the product-sum obtained by the accumulator 214 of the second product-sum calculation circuit 220 is loaded into the shift register 206, and sent to the non-linear transformation unit 209 at a predetermined timing. As the multipliers 207 and 213 and the accumulators 208 and 214, for example, 12 identical components operating according to the same clock are provided. The shift register 206 includes, for example, flip-flops capable of holding the outputs from the 12 accumulators 214. Only predetermined significant bits of the output from the accumulator 208 or 214 are output to the subsequently connected ring buffer 212 or shift register 206.

Figure 6:
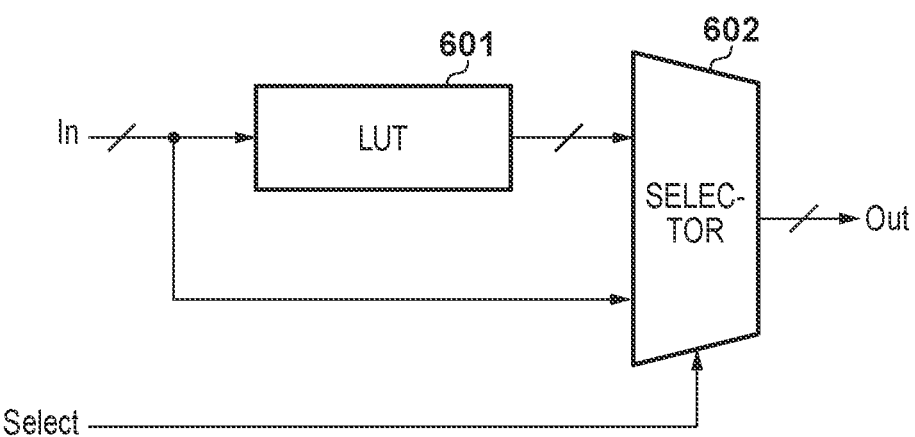
FIG. 6 is a block diagram showing the arrangement of a non-linear transformation unit according to the first embodiment.

FIG. 6 is a block diagram showing the arrangement of the non-linear transformation unit 209 according to the first embodiment.

The non-linear transformation unit 209 includes a lookup table (LUT) 601 and a selector 602. The LUT 601 refers to the product-sum calculation result held as address data (In) in the ROM or the like. For example, this ROM stores, in advance, a value obtained by performing non-linear transformation for an output corresponding to an address value. The selector 602 outputs the value obtained by performing non-linear transformation (the output value of the LUT 601), or directly outputs the product-sum calculation result (In) when no non-linear transformation is performed (Out). The controller 201 supplies a selection signal (Select) to the selector 602. That is, the selector 602 is controlled in accordance with the value in the "non-linear transformation" register (to be described later) of the controller 201. Note that the register sets 801 to 803 (see FIG. 8) each including a "non-linear transformation" register are arranged for respective feature planes, as will be described later. Thus, the presence/absence of non-linear transformation processing can be selected for each feature plane. By allowing selection of the presence/absence of non-linear transformation for each feature plane, a large-scale network including layers with and without non-linear transformation processing can be built. Furthermore, data obtained by the non-linear transformation unit 209 is stored at a predetermined address in the RAM 100. The storage address in the RAM 100 is controlled in accordance with the setting of a register group 702 of the controller 201 and the operation of a sequence controller 701 (see FIG. 7).

Details of the controller 201 will be described next.

Figure 7:
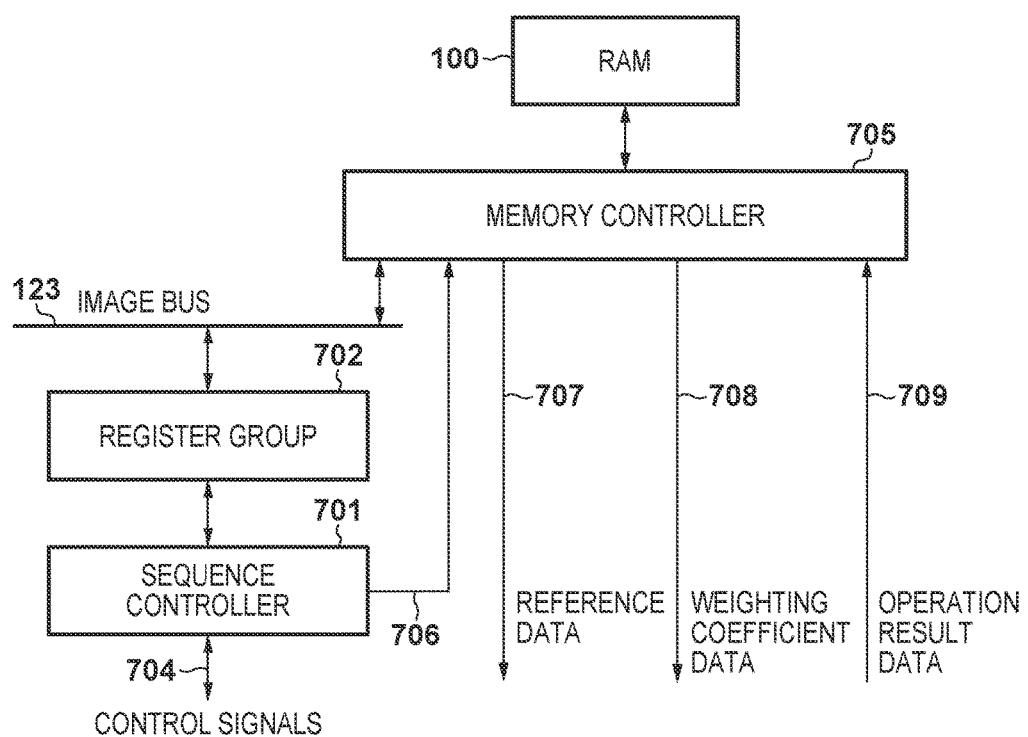
FIG. 7 is a block diagram showing the arrangement of the controller of the CNN processing unit according to the first embodiment.

FIG. 7 is a block diagram showing the arrangement of the controller 201 of the CNN processing unit 122 according to the first embodiment.

The controller 201 includes the sequence controller 701, the register group 702 (memory area), and a memory controller 705. The sequence controller 701 inputs/outputs various control signals 704 for controlling the operation of the CNN processing unit 122 in accordance with information set in the register group 702. Similarly, the sequence controller 701 generates a control signal 706 for controlling the memory controller 705. The sequence controller 701 includes, for example, a sequencer formed from a binary counter, a Johnson counter, or the like. The register group 702 includes a plurality of register sets, and each register set holds information for performing one hierarchical process. The register group 702 is configured to be externally accessed.

Figure 8:
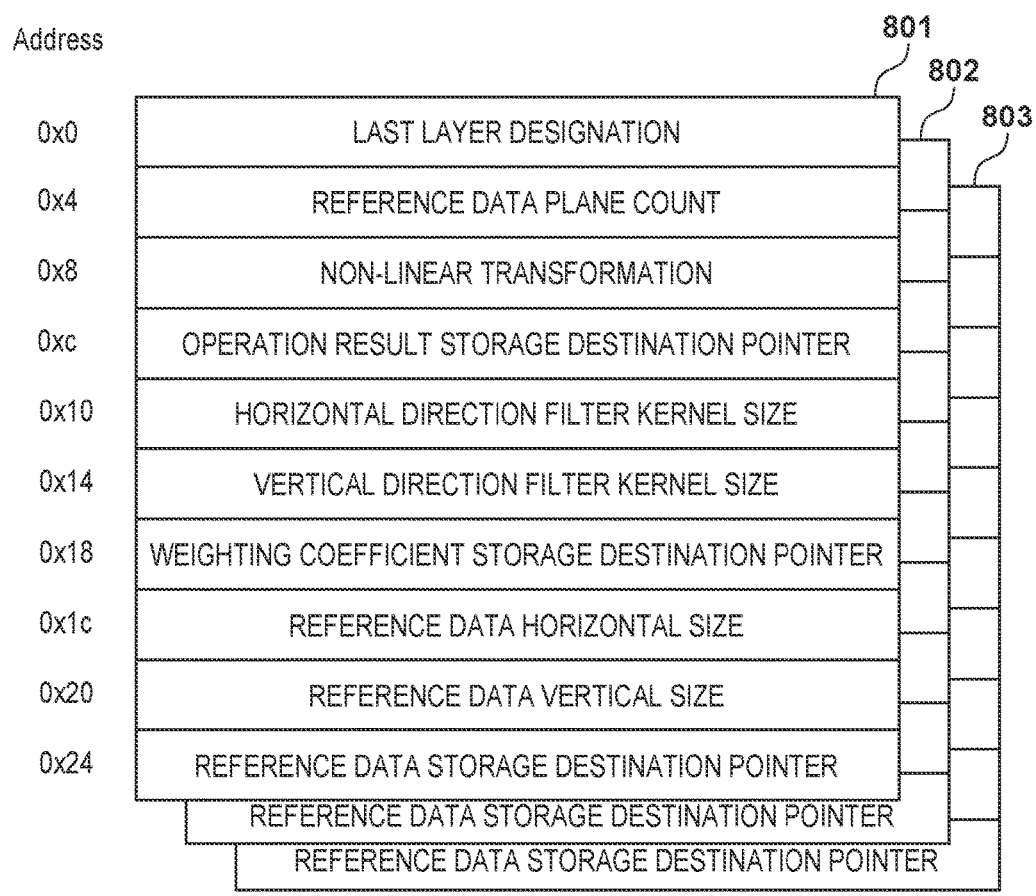
FIG. 8 is a view showing an example of information set in the register group of the controller according to the first embodiment.

FIG. 8 is a view showing an example of the information set in the register group 702 of the controller 201 according to the first embodiment.

In this example, the three register sets 801, 802, and 803 are included in the register group 702, and one of the register sets holds information necessary to process one feature plane. The CPU 127 writes predetermined values in advance in the register group 702 via the bridge 124 and the image bus 123. Each register of each of the register sets 801 to 803 has a 32-bit length.

Referring to FIG. 8, a "last layer designation" register is a register for designating whether a feature plane corresponding to this register set is in a last layer. If the value in this register is "1", this indicates that the feature plane as a processing target is in the last layer, and detection processing ends upon end of processing of the feature plane. A "reference data plane count" register is a register for designating the number of feature planes (data areas) in the previous layer connected to the target feature plane and, for example, "3" is set if the number of feature planes in the previous layer connected to the target feature plane is "3". The "non-linear transformation" register is a register for designating the presence/absence of non-linear transformation. If "1" is set in this register, non-linear transformation processing is performed. Alternatively, if "0" is set in this register, no non-linear transformation processing is performed. An "operation result storage destination pointer" register is a register for designating the first address of an area in the RAM 100 for holding the operation result of the target feature plane, and stores the operation result in the raster scan order by setting the address value as the first pointer. A "horizontal direction filter kernel size" register and a "vertical direction filter kernel size" register are registers for designating the kernel size of a filter to be used to operate the target feature plane. A "weighting coefficient storage destination pointer" register indicates the storage address of a weighting coefficient to be used to operate the target feature plane, which is stored in the RAM 100. For example, weighting coefficient data includes sets of coefficients, the number of which is equal to the value in the "reference data plane count" register, and sequentially stores them from the address designated in the "weighting coefficient storage destination pointer" register. That is, the RAM 100 stores coefficient data, the number of which is defined by ("horizontal direction filter kernel size"+"vertical direction filter kernel size")דreference data plane count". A "reference data horizontal size" register and a "reference data vertical size" register are registers respectively indicating the number of pixels of reference data in the horizontal direction and the number of lines of the reference data in the vertical direction. The reference data are stored in the RAM 100 in the raster scan order from the address indicated by the "reference data storage destination pointer" register. That is, the reference data, the number of which is defined by ("reference data horizontal size"ד"reference data vertical size")דreference data plane count", are stored in the RAM 100.

The plurality of registers are provided for each feature plane. If the contents of the "reference data storage destination pointer" register of the feature plane as an operation target indicate the "operation result storage destination pointer" of a connection target feature plane in the previous layer, the feature plane in the previous layer and the target feature plane are connected. Therefore, it is possible to build an arbitrary hierarchical connection relationship for each feature plane by only the register setting (pointer setting).

Figure 9:
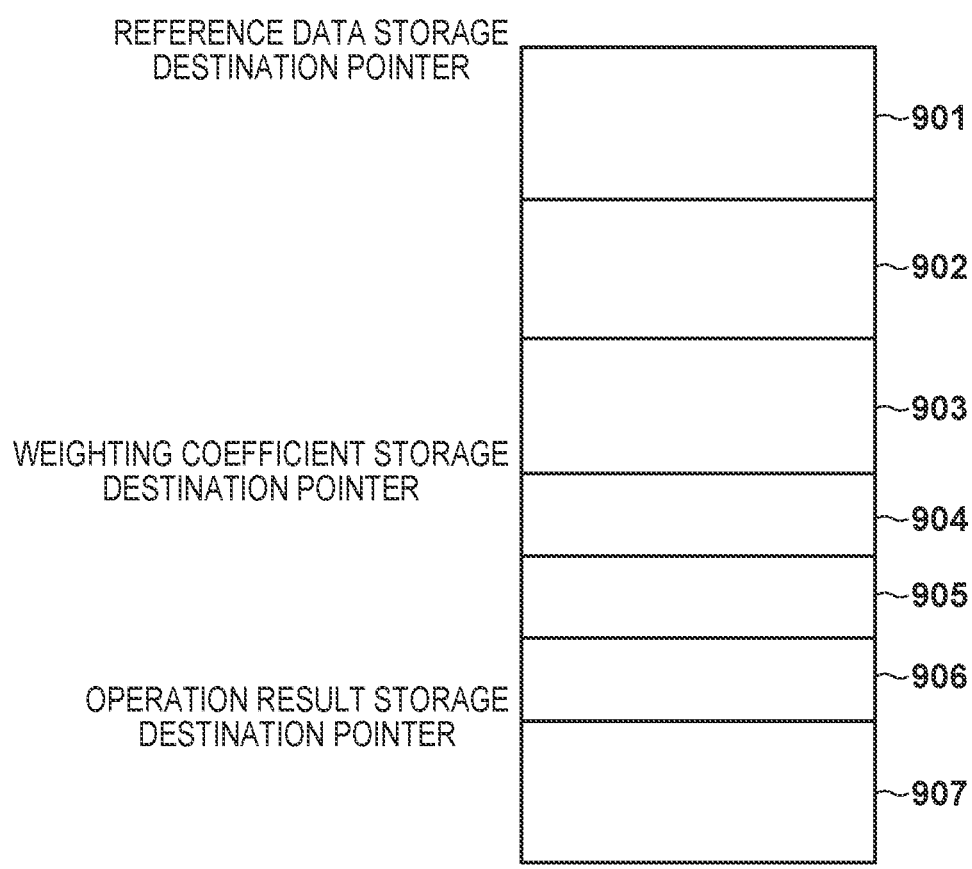
FIG. 9 is a view showing an example of the memory map of reference data, weighting coefficient data, and an operation result stored in a RAM according to the first embodiment.

FIG. 9 is a view showing an example of the memory map of the reference data, weighting coefficient data, and operation result stored in the RAM 100 according to the first embodiment.

Assume that the connection count of the previous layer is "3". In this case, areas 901 to 903 are areas for storing three reference data, and areas 904 to 906 are areas for storing filter kernel coefficients corresponding to the respective reference data. An area 907 indicates an area for storing the operation result of a feature plane. For example, each area stores raster-scanned data. Therefore, the controller 201 can access necessary reference data and kernel coefficient data based on the first pointer information and the information about the size which are stored in the register group 702. Furthermore, at the time of the operation of a feature plane in the next layer, it is possible to execute the processing at high speed without transferring unnecessary data by only designating, as a reference data storage area, the area 907 storing the operation result (by only setting data in the register group 702).

The sequence controller 701 performs sequence control related to an operation timing in accordance with contents such as the "horizontal direction filter kernel size", "vertical direction filter kernel size", "reference data horizontal size", and "reference data vertical size" in FIG. 8.

The memory controller 705 arbitrates processing of reading out and writing reference data 707, weighting coefficient data 708, and operation result data 709 from and in the RAM 100 in accordance with the control signal 706 generated by the sequence controller 701. More specifically, the memory controller 705 controls access to the RAM 100 via the image bus 123, readout of the reference data 707, readout of the weighting coefficient data 708, and writing of the operation result data 709. Note that the data width of the RAM 100 and that of each bus (each of the data 707 to 709) are, for example, 32 bits.

The operation of the object detection apparatus with the above arrangement will be described next.

FIG. 10A is a flowchart for explaining the operation of the object detection apparatus according to the first embodiment.

In step S1001, the CPU 127 executes various initialization processes before the start of detection processing. For example, the CPU 127 transfers weighting coefficients necessary for the operation of the CNN processing unit 122 from the ROM 128 to the RAM 100, and makes various register settings for defining the operation of the CNN processing unit 122, that is, the configuration of the CNN network. More specifically, predetermined values are set in the plurality of registers (see FIG. 8) existing in the controller 201 of the CNN processing unit 122. Similarly, values necessary for the operation are also written in the register such as the preprocessing unit 125. Next, the process advances to step S1002, and the CPU 127 causes the image input unit 120 to input a signal output from an image sensor and transform the signal into digital data, and stores the data in a frame buffer (not shown) in a frame unit. The process advances to step S1003, and the CPU 127 causes the preprocessing unit 125 to execute image transformation processing based on a predetermined signal. At this time, the preprocessing unit 125 extracts luminance data from the image data in the frame buffer of the image input unit 120, and performs contrast correction processing. When extracting luminance data, for example, luminance data is generated from RGB image data by general linear transformation processing. In contrast correction, for example, well-known contrast correction processing is applied to enhance the contrast. The luminance data having undergone the contrast correction processing by the preprocessing unit 125 is stored in the RAM 100 as an image for detection. Upon completion of preprocessing for image data of one frame, the CPU 127 causes the controller 201 of the CNN processing unit 122 to execute object detection processing based on a completion signal (not shown) from the preprocessing unit 125 (steps S1004 and S1005).

Figure 23:
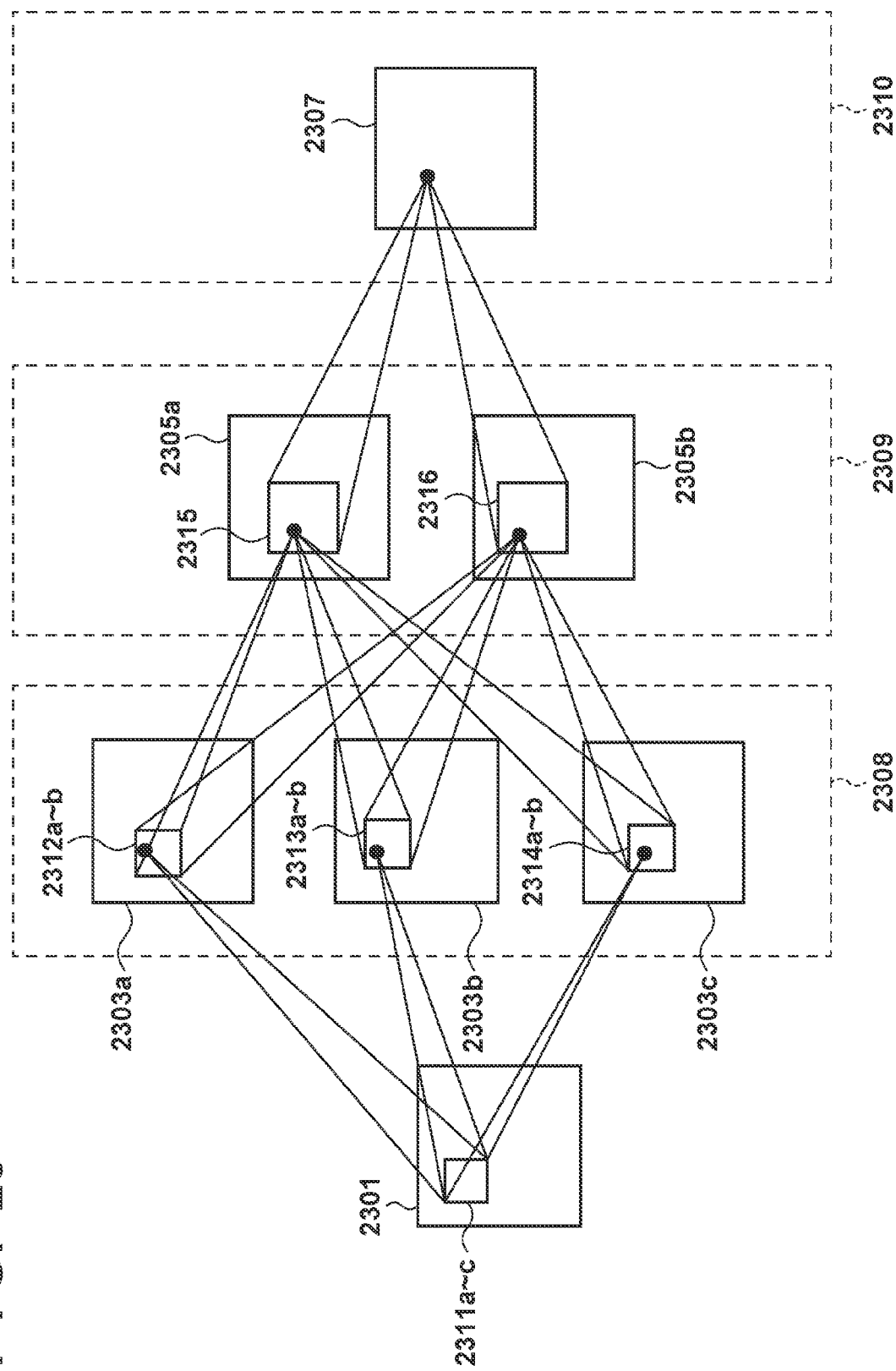
FIG. 23 is a block diagram showing an example in which a CNN operation for image data is implemented by neural networks.
Figure 24:
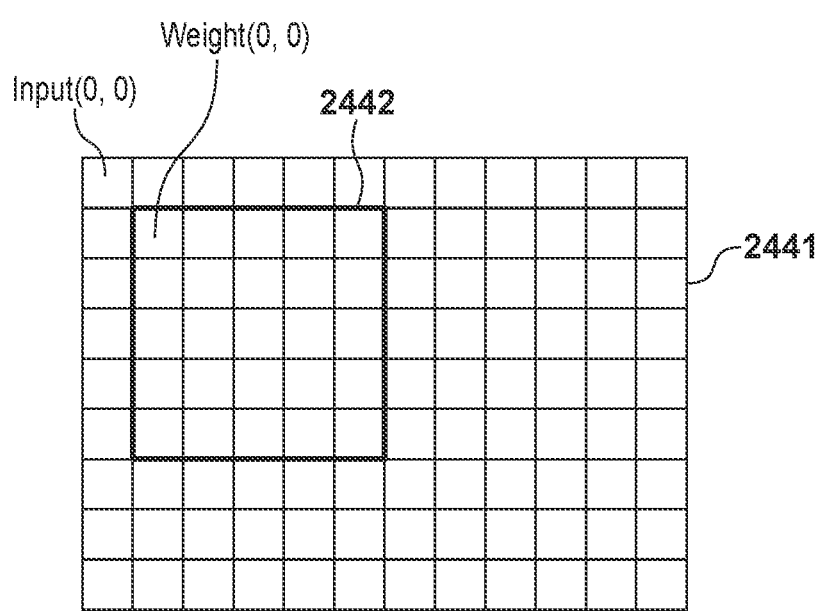
FIG. 24 is a view showing an example of a kernel of a convolution filter.

In this object detection processing, in steps S1004 and S1005, the CNN processing unit 122 performs convolution operation for each feature plane (for example, each of the feature planes 2303a to 2303c shown in FIG. 23 or the like). When the processing ends for all the feature planes, the process advances to step S1006 (in the case of FIG. 23, when the calculation of the feature plane 2307 ends) to generate an interrupt signal for the CPU 127. That is, if the controller 201 ends the convolution operation processing of one feature plane in step S1004, the process advances to step S1005 to determine based on the contents of the "last layer designation" register of the register set 801 whether the feature plane is in the last layer. If it is determined that the feature plane is not in the last layer, the process returns to step S1004 to execute processing of the next feature plane. At this time, when processing the next feature plane, the controller 201 performs similar convolution operation processing in accordance with the contents of the register set existing at the next address of the register group 702. If the register set indicates the last layer, the controller 201 generates an end notification interrupt for the CPU 127 in step S1006 after the end of the predetermined convolution operation processing. The process advances to step S1007, and the CPU 127 determines whether the processing for all the images necessary for the detection processing has ended. If the processing has not ended, the process returns to step S1002. For example, when detecting a predetermined object from a moving image, the CPU 127 continuously executes, for all the target images, the above-described processing for each frame image. If the processing ends for all the target images, the process ends.

FIG. 10B is a flowchart for explaining processing which is executed by the CPU 127 in response to the end notification interrupt from the CNN processing unit 122. Note that a program for causing the CPU 127 to execute the processing is stored in the ROM 128. When the CPU 127 reads out and executes the program, the processing indicated by the flowchart is implemented.

As shown in FIGS. 11A to 13B, the convolution operation processing according to the first embodiment is executed in two stages using the one-dimensional filter kernel in the horizontal direction and that in the vertical direction. The one-dimensional filter kernels in the horizontal and vertical directions respectively indicate two filter kernels respectively having one-dimensional structures in the horizontal and vertical directions, which are obtained by decomposing a filter kernel having a two-dimensional structure, as described above.

Details of the filter kernel having the two-dimensional structure and the filter kernels respectively having the one-dimensional structures will be described. General convolution operation processing will be explained first.

Figure 14:
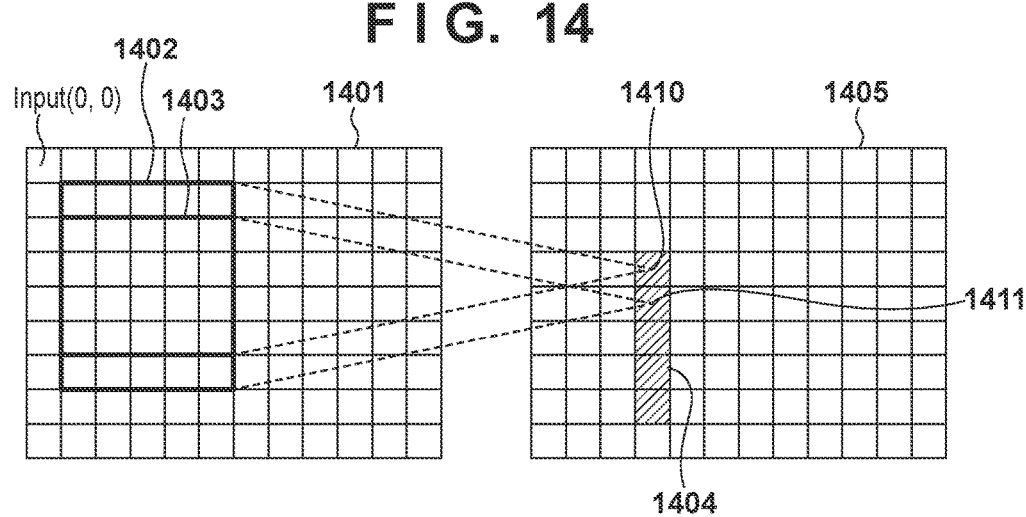
FIG. 14 is a view showing a practical example of a general convolution operation.

FIG. 14 is a view showing a practical example of a general convolution operation. In this example, data obtained by a raster scan is represented by a two-dimensional coordinate system.

Reference numeral 1401 denotes a reference data plane which indicates the operation result (input(x, y), x: horizontal direction position, y: vertical direction position) of the previous layer obtained by storing respective blocks (schematically represented by minimum squares) in the RAM 100 in the raster scan order; 1405, feature plane data as a calculation target which indicates an operation result (output (x, y), x: horizontal direction position, y: vertical direction position) obtained by raster-scanning the respective blocks; and 1402 and 1403, reference data ranges necessary for a filter operation when calculating feature plane data 1410 and 1411 of output(4, 4) and output(4, 5), respectively. In this example, the filter kernel size is defined by "5" in the horizontal direction and "5" in the vertical direction. For example, Japanese Patent No. 5376920 describes a convolution operation processing apparatus for executing a general filter operation. In this case, for example, reference numeral 1404 denotes a region of feature plane data to simultaneously undergo a filter operation. If, for example, the parallelism is "5", data output (4, y) at feature plane positions of y=4 to 8 are simultaneously operated. Therefore, a filter operation is performed while scanning the region 1404 as a parallel processing target for every one pixel in the horizontal direction and for every five lines in the vertical direction, thereby performing a filter operation for two-dimensional data string. This filter operation processing is described in detail in Japanese Patent No. 5376920 and a more detailed description thereof will be omitted.

Subsequently, a method of executing a convolution operation by decomposing a filter kernel having a two-dimensional structure into two filter kernels respectively having one-dimensional structures in the horizontal and vertical directions according to the first embodiment will be described.

It is known that the weighting coefficient matrix of a filter kernel having a two-dimensional structure can be approximated by multiplication using filter kernels respectively having one-dimensional structures in the horizontal and vertical directions, given by:

$$\text{output}(x, y) = \sum_{row=0}^{rowSize-1} \sum_{column=0}^{columnSize-1} (\text{input}(x + \text{column}, y + \text{row}) \times weight_{horizontal} (\text{column}) \times weight_{vertical}(\text{row})) \qquad (2)$$

Note that in fact, a method is often used in which the approximation accuracy is improved by obtaining the total of filter operation results using a combination of a plurality of filter kernels in the horizontal and vertical directions, given by:

$$\text{output}(x, y) = \sum_{pair=0}^{pairSize-1} \sum_{row=0}^{rowSize-1} \sum_{column=0}^{columnSize-1} (\text{input}(x + \text{column}, y + \text{row}) \times weight_{pair,horizontal}(\text{column}) \times weight_{pair,vertical}(\text{row})) \qquad (3)$$

where a subscript "pair" represents the combination of the filter kernels.

The method is described in detail in Denton and a more detailed description will be omitted.

A convolution operation method for executing equations (2) and (3) will be described next.

Figure 11A:
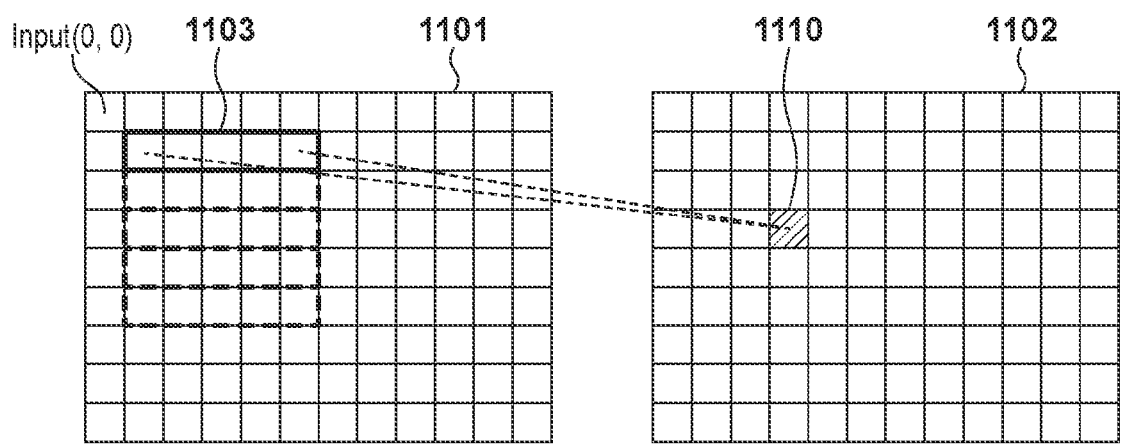
FIGS. 11A and 11B are views for explaining an example of convolution operation processing according to the first embodiment.
Figure 11B:
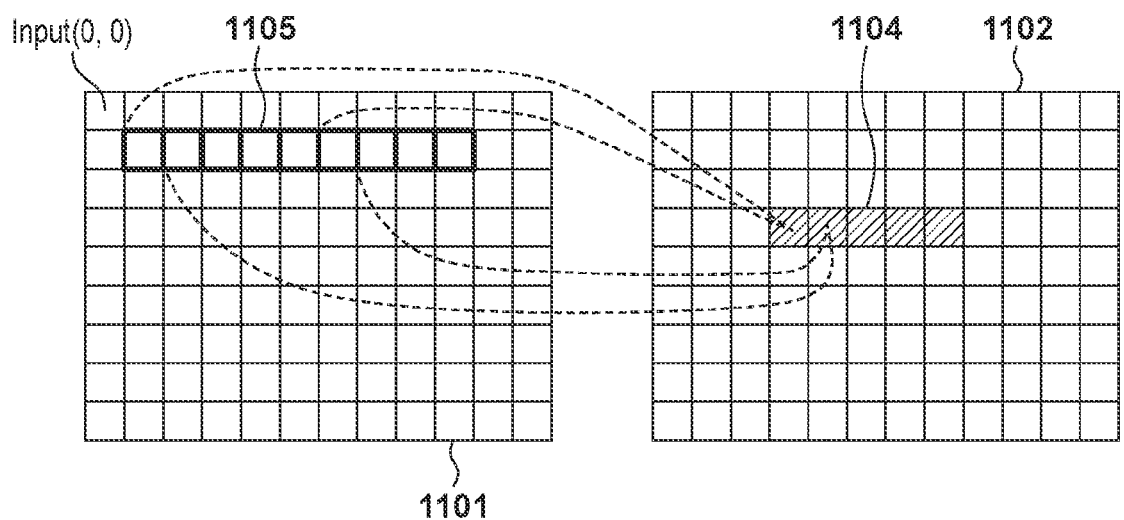
Figure 12A:
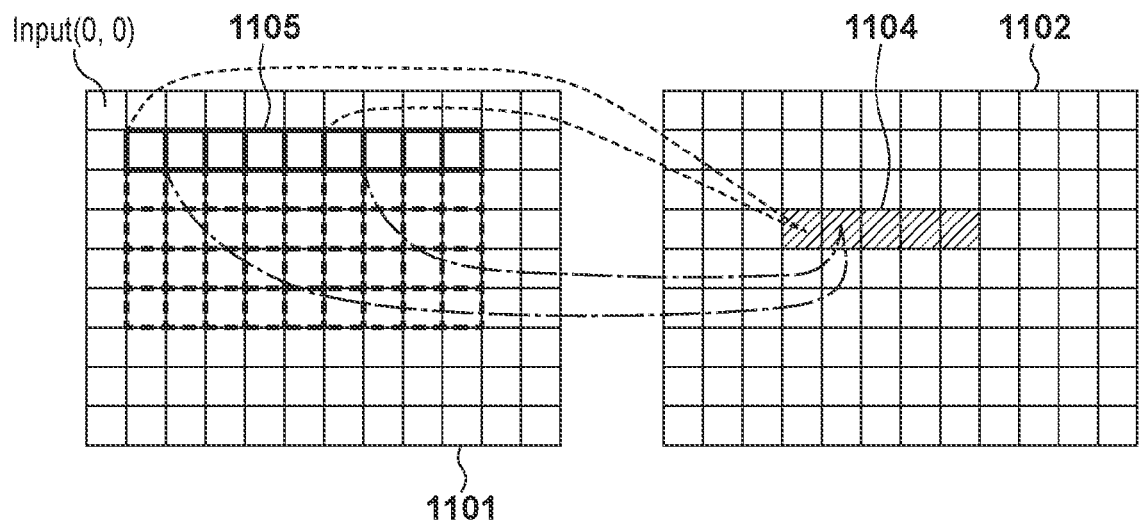
FIGS. 12A and 12B are views for explaining an example of convolution operation processing according to the first embodiment.

As shown in FIGS. 11A, 11B, and 12A, the first product-sum calculation circuit 200 executes a convolution operation using the filter kernel having the one-dimensional structure in the horizontal direction.

FIG. 11A is a view for explaining a practical example of convolution operation processing in one feature plane data. In FIG. 11A, data obtained by a raster scan is represented by the two-dimensional coordinate system.

Reference numeral 1101 denotes a reference data plane which indicates the operation result (input(x, y), x: horizontal direction position, y: vertical direction position) of the previous layer obtained by storing respective blocks (schematically represented by minimum squares) in the RAM 100 in the raster scan order; 1102 denotes target feature plane data and each block indicates operation results (output (x, y), x: horizontal direction position, y: vertical direction position) obtained by the raster-scanning; and 1103, a reference data range for which a convolution operation is executed in a filter operation when calculating feature plane data 1110 at the position of output(4, 4).

FIG. 11A shows a case in which the size of the filter kernel in the horizontal direction is "5", and the reference data range 1103 is indicated by input(x, y) for x=2 to 6 equal to the size of the filter kernel in the horizontal direction. In fact, as indicated by dotted lines in FIG. 11A, an operation for a reference data plane of a predetermined range is executed by repeating the convolution operation in the vertical direction five times.

Furthermore, FIG. 11B shows a region of feature plane data 1104 to parallelly undergo a filter operation. For example, the region of the feature plane data 1104 indicates the region of feature plane data to simultaneously undergo filter operations. If the parallelism is 5, feature plane data of output(x, 4) for x=4 to 8 are simultaneously operated. At this time, the range of reference data for which a convolution operation is executed is indicated by a reference plane data region 1105 surrounded by thick lines in FIG. 11B. Note that in FIG. 11B, dotted lines indicating the correspondence between each feature plane data and the reference data range are shown only for output(x, 4) for x=4 to 5 as the feature plane data 1104.

The kernel size of the original filter is defined by "5" in the horizontal direction and "5" in the vertical direction. To obtain the feature plane data 1104, a filter operation is performed for the two-dimensional data string while scanning the reference plane data region 1105 as a parallel processing target for each line in the vertical direction, as shown in FIG. 12A.

Figure 12B:
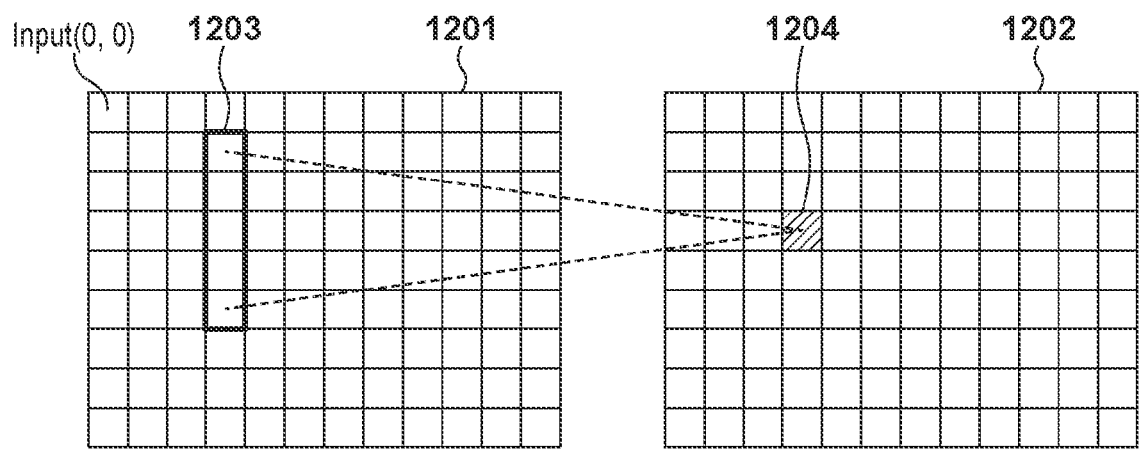
Figure 13A:
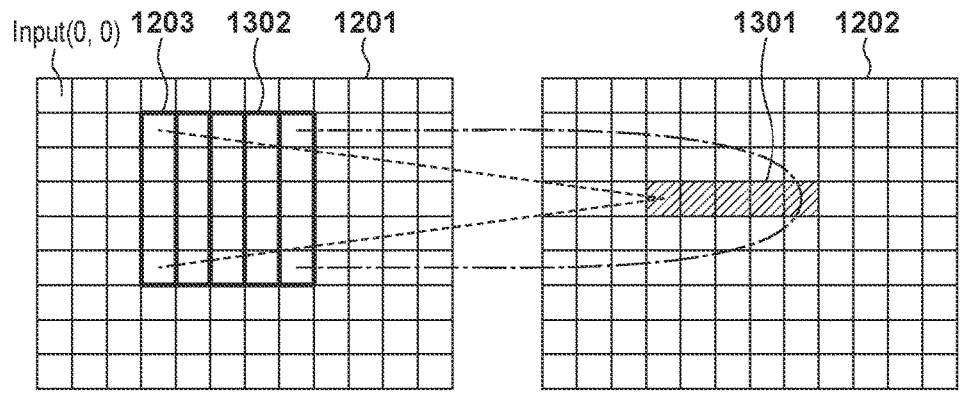
FIGS. 13A and 13B are views for explaining an example of convolution operation processing according to the first embodiment.
Figure 13B:
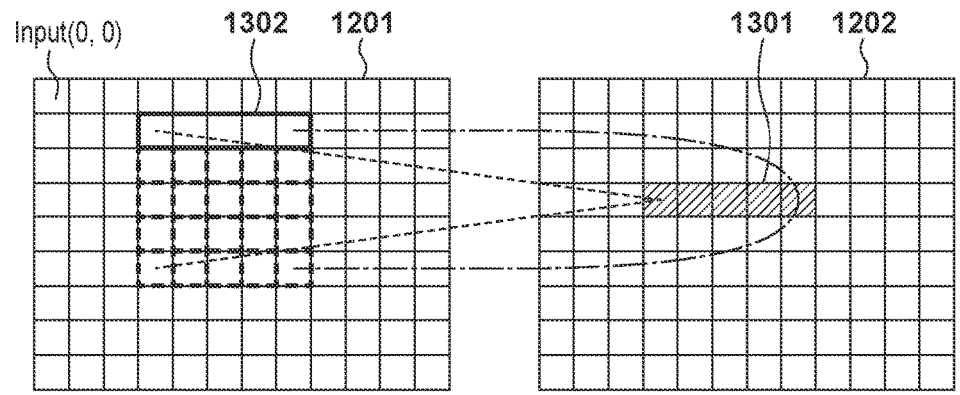

Subsequently, as shown in FIGS. 12B, 13A, and 13B, the second product-sum calculation circuit 220 executes a convolution operation using the filter kernel having the one-dimensional structure in the vertical direction for the result of the convolution operation using the above-described filter kernel in the horizontal direction.

FIG. 12B is a view showing a practical example of convolution operation processing of obtaining one feature plane data. FIG. 12B shows the example by a two-dimensional coordinate system on a reference data plane.

Reference numeral 1201 denotes a reference data plane indicating the results of the convolution operations using the filter kernel in the horizontal direction. Respective blocks (schematically represented by minimum squares) indicate the results (input(x, y), x: horizontal direction position, y: vertical direction position) of the convolution operations using the filter kernel in the horizontal direction. Note that in FIGS. 12B, 13A, and 13B, the results of the convolution operations using the filter kernel in the horizontal direction are arranged and displayed on the entire reference plane data. In fact, however, the result of the convolution operation using the filter kernel in the horizontal direction is input from the accumulator 208 of the first product-sum calculation circuit 200 to the corresponding ring buffer 212 of the second product-sum calculation circuit 220, as needed.

For the sake of easy understanding of an operation method for implementing equations (2) and (3) described above, the results of the convolution operations using the filter kernel in the horizontal direction are arranged and displayed on the entire reference plane data. Reference numeral 1203 denotes a range of reference data for which a convolution operation is executed in a filter operation when calculating feature plane data 1204 at the position of output (4, 4). FIG. 12B shows a case in which the size of the filter kernel in the vertical direction is "5", and the reference data range 1203 is indicated by input(4, y) for y=2 to 6 equal to the size of the filter kernel in the vertical direction.

In fact, as indicated by dotted lines in FIG. 13B, an operation using the filter kernel in the vertical direction is executed for each coefficient data, and this is repeated in the vertical direction five times to execute an operation for the reference data plane in the convolution operation. Furthermore, FIG. 13A shows a region 1301 of the feature plane data to undergo a filter operation. For example, the region 1301 of the feature plane data indicates a region of feature plane data to simultaneously undergo filter operations. If, for example, the parallelism is "5", the feature plane data of output(x, 4) for x=4 to 8 are simultaneously operated. Note that in FIG. 13A, dotted lines and one-dot dashed lines indicating the correspondences between the feature plane data and the reference data ranges are shown only for output(x, 4) for x=4 and 8. As will be described later, however, the convolution operation is executed for each coefficient data of the filter kernel in the vertical direction, and thus a product-sum calculation is executed for each line of the reference plane data. That is, if the size of the original filter kernel is defined by "5" in the horizontal direction and "5" in the vertical direction, a filter operation is performed while scanning a region 1302 of the reference plane data as a parallel processing target in the vertical direction for each line, as shown in FIG. 13B. In this way, the filter operation is performed for the two-dimensional data string. In this case, a function of scanning the reference plane data in the vertical direction for each line is implemented by the ring buffer 212 in the second product-sum calculation circuit 220.

As described above, if the convolution operation using the filter kernel in the horizontal direction and the convolution operation using the filter kernel in the vertical direction are executed for the reference data, the operation result is indicated by equation (2). As described above, the weighting coefficient matrix of the filter kernel having the two-dimensional structure can be approximated by multiplication indicated by equation (2). Therefore, the above operation processing can execute the approximation operation of the convolution operation processing using the general filter kernel having the two-dimensional structure.

As described above, the convolution operations using the filter kernels in the horizontal and vertical directions are performed by executing filter operations while simultaneously scanning the regions 1104 and 1301 of the feature plane data for each line in the vertical direction and for every five pixels in the horizontal direction. It is thus possible to perform a filter operation at high speed for the two-dimensional sequence.

Figure 15:
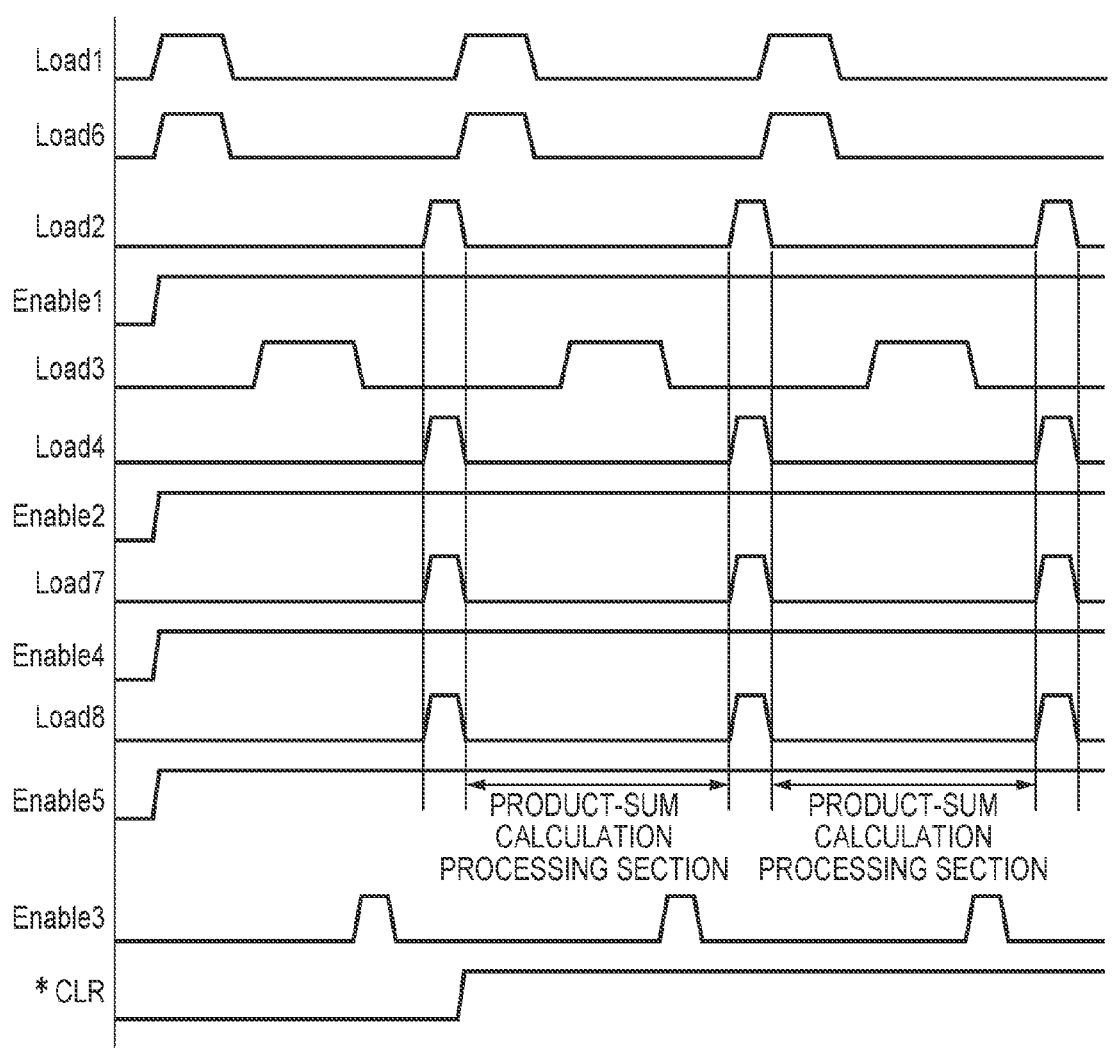
FIG. 15 is a timing chart for explaining an operation at the time of convolution operation processing in the CNN processing unit according to the first embodiment.

FIG. 15 is a timing chart for explaining an operation at the time of convolution operation processing in the CNN processing unit 122 according to the first embodiment. FIG. 15 shows part of the operation (step S1004) of the convolution operation processing of one feature plane. Signals shown in FIG. 15 synchronously operate based on a clock signal (not shown). Note that in the convolution operation processing according to the first embodiment, the convolution operation using the filter kernel in the horizontal direction and the convolution operation using the filter kernel in the vertical direction are parallelly executed, as described above.

Load1 and Load6 signals indicate enable signals for loading weighting data into the storage units 202 and 210, respectively. While the Load1 and Load6 signals are valid (at a signal level of 1), the controller 201 reads out weighting data in the horizontal and vertical directions from the RAM 100, and writes them in the storage units 202 and 210, respectively. At this time, the sizes of the filter kernels in the horizontal and vertical directions are held in the register group 702. Based on the weighting coefficient storage destination pointer, kernel size, and reference data plane count which are designated in the register group 702, the controller 201 determines the address of weighting data to be read out. Assume that the data width of the RAM 100 is 32 bits, and the data width of each weighting coefficient is 8 bits. In this case, when writing 12 weighting coefficients in the horizontal direction in the storage units 202 and 210, load processing is completed by three clocks. Note that a readout and writing cycle for the RAM 100 is all completed by one clock.

In the first embodiment, the size of the filter kernel in the horizontal direction is equal to that of the filter kernel in the vertical direction. Thus, the time taken to write 12 weighting coefficients in the vertical direction in the storage unit 210 is equal to that for the horizontal direction. Therefore, in the first embodiment, processing of reading out and writing the weighting coefficients of the filter kernel in the horizontal direction and that of reading out and writing the weighting coefficients of the filter kernel in the vertical direction are completed at the same time.

Upon loading the weighting coefficients into the respective storage units, the controller 201 enables a Load3 signal to start loading the reference data in the first product-sum calculation circuit 200. Similarly to the Load1 signal, the Load3 signal is enabled when the signal level is "1". Simultaneously with setting of the Load3 signal to "1", the controller 201 reads out the reference data from the RAM 100, and sets them in the storage unit 203. The number of data to be set is determined based on the filter kernel size and parallelism held in the register group 702. Based on the reference data storage destination pointer, reference data horizontal size, reference data vertical size, and reference data plane count, which are designated in the register group 702, the controller 201 determines the address of the reference data to be read out from the RAM 100. Since the significant digits of the reference data are 8 bits, if, for example, 23 reference data are written in the storage unit 203, a writing sequence is completed in six cycles. For example, if the size of the filter kernel in the horizontal direction is "12", it is necessary to load data whose parallelism is 23 (12+12−1=23).

A *CLR signal is a signal for initializing the accumulators 208 and 214 in the first product-sum calculation circuit 200 and second product-sum calculation circuit 220. If the *CLR signal is 0 (low level), the registers 502 (FIG. 5) of the accumulators 208 and 214 are initialized to "0". Before the start of the convolution operation of new feature plane data, the controller 201 sets the *CLR signal to 0.

The Load2 signal is a signal for instructing initialization of the shift register 204. If the Load2 signal is 1 and the Enable1 signal is valid (at a signal level of 1), the plurality of weighting coefficient data held in the storage unit 202 are loaded into the shift register 204 at once. The Enable1 signal is a signal for controlling the data shift of the shift register 204, and is set to 1 all the time during the operation, as shown in FIG. 15. Therefore, if the Load2 signal is 1, the shift register 204 latches the output from the storage unit 202 in response to the clock signal. If the Load2 signal is 0, the shift register 204 continues the shift processing in response to the clock signal. If the number of clocks corresponding to the size of the filter kernel is counted, the sequence controller 701 of the controller 201 enables the Load2 signal. This stops the shift operation of the shift register 204, and also loads the weighting coefficient data held in the storage unit 202 into the shift register 204 at once. That is, the sequence controller 701 loads the weighting coefficient data into the shift register 204 at once in the horizontal direction unit of the filter kernel, and shifts out the loaded coefficients in response to an operation clock.

Similarly, the Load7 signal is a signal for instructing initialization of the shift register 211. If the Load7 signal is 1 and the Enable4 signal is valid (at a signal level of 1), the plurality of weighting coefficient data held in the storage unit 210 are loaded into the shift register 211 at once. The Enable4 signal is a signal for controlling the data shift of the shift register 211, and is set to 1 all the time during the operation, as shown in FIG. 15. Therefore, if the Load7 signal is 1, the shift register 211 latches the output from the storage unit 210 in response to the clock signal. If the Load7 signal is 0, the shift register 211 continues the shift processing in response to the clock signal. If the number of clocks corresponding to the size of the filter kernel is counted, the sequence controller 701 of the controller 201 enables the Load7 signal. This stops the shift operation of the shift register 211, and also loads the weighting coefficient data held in the storage unit 210 into the shift register 211 at once. That is, the sequence controller 701 loads the weighting coefficient data into the shift register 211 at once in the vertical direction unit of the filter kernel, and shifts out the loaded coefficients in response to an operation clock.

The Load4 signal is a signal for instructing initialization of the shift register 205. If the Load4 signal is 1 and the Enable2 signal is valid (at a signal level of 1), the reference data held in the storage unit 203 are loaded into the shift register 205 at once. Note that the Enable2 signal is a signal for controlling the data shift of the shift register 205, and is set to 1 all the time during the operation, as shown in FIG. 15. Therefore, if the Load4 signal is 1, the shift register 205 latches the output from the storage unit 203 in response to the clock signal. If the Load4 signal is 0, the shift register 205 continues the shift processing in response to the clock signal. When the number of clocks corresponding to the size of the filter kernel in the vertical direction is counted, the sequence controller 701 of the controller 201 enables the Load4 signal. This stops the shift operation of the shift register 205, and also loads the reference data held in the storage unit 203 at once. That is, the necessary reference data are loaded into the shift register 205 at once for each column of the filter kernel, and shifts the loaded reference data in response to an operation clock. In this way, the controller 201 controls the Load4 signal at the same timing as that of the Load2 signal.

Each accumulator 208 executes a product-sum calculation in synchronism with the clock. Therefore, product-sum calculation processes according to the size of the filter kernel are simultaneously executed for a plurality of points of feature plane data to be calculated in accordance with the shift operations of the shift registers 204 and 205. More specifically, during the shift operation periods (product-sum calculation processing sections in FIG. 15) of the shift registers 204 and 205, a product sum calculation for the filter kernel in the horizontal direction is performed. Such operation for each row is repeated in the horizontal direction while interchanging the weighting coefficient data and the reference data, thereby generating a two-dimensional convolution operation result according to the parallelism. The controller 201 controls the respective signals in accordance with the filter kernel size and the parallelism, and parallelly executes product-sum calculation processing and processing of supplying data (weighting coefficient data and reference data) necessary for the product-sum calculation processing from the RAM 100.

The Load8 signal is a signal for instructing initialization of the first registers of the ring buffers 212. If the Load8 signal is 1 and the Enable5 signal is valid (at a signal level of 1), the reference data held in the accumulators 208 of the first product-sum calculation circuit 200 are loaded into the first registers of the ring buffers 212 at once. Note that the Enable5 signal is a signal for controlling the data shifts of the ring buffers 212, and is set to 1 all the time during the operation, as shown in FIG. 15. Therefore, if the Load8 signal is 1, the ring buffers 212 respectively latch the outputs from the accumulators 208 of the first product-sum calculation circuit 200 in response to the clock signal. Alternatively, if the Load8 signal is 0, the ring buffers 212 respectively execute ring shift processes in response to the clock signal. When the number of clocks corresponding to the size of the filter kernel in the vertical direction is counted, the sequence controller 701 of the controller 201 enables the Load8 signal. This stops the shift operations of the ring buffers 212, and also loads the reference data held in the accumulators 208 of the first product-sum calculation circuit 200 into the ring buffers 212 at once, respectively. That is, the ring buffers 212 load necessary reference data at once respectively for each kernel, and shift the loaded reference data in response to an operation clock. In this way, the controller 201 controls the Load8 signal at the same timing as that of the Load7 signal.

Each accumulator 214 continues the product-sum calculation processing in synchronism with the clock. Therefore, product-sum calculation processes according to the size of the filter kernel are simultaneously executed for a plurality of points of feature plane data to be calculated in accordance with the shift operations of the shift register 211 and ring buffers 212. More specifically, during the shift operation periods (product-sum calculation processing sections in FIG. 15) of the shift register 211 and ring buffers 212, a product-sum calculation for the filter kernel in the vertical direction is performed. Such operation for each column is repeated in the vertical direction while interchanging the weighting coefficient data and the reference data, thereby generating a convolution operation result according to the parallelism. The controller 201 controls the respective signals in accordance with the filter kernel size and the parallelism, and parallelly executes product-sum calculation processing and processing of supplying data (weighting coefficient data) necessary for the product-sum calculation processing from the RAM 100.

The Load5 signal is a signal for parallelly loading the results of the accumulators 214 of the second product-sum calculation circuit 220 into the shift register 206. Upon end of the product-sum calculation of the filter kernel in the vertical direction, the controller 201 sets the Load5 signal (not shown) and the Enable3 signal to 1. If the Load5 signal is 1 and the Enable3 signal is 1, the shift register 206 loads the outputs from the accumulators 214 at once. Note that in FIG. 15, the calculated convolution operation results have been latched into the shift register 206. If data loading to the storage units 202, 210, and 203 is complete during the shift operations of the shift registers 204, 205, and 211 and the ring buffers 212, the controller 201 enables the Enable3 signal (1). This shifts out the operation results held in the shift register 206. That is, the signal OUTn (the last output from the shift register 206) is output to the non-linear transformation unit 209. The operation result shifted out from the shift register 206 undergoes transformation processing by the non-linear transformation unit 209. After that, the controller 201 stores the operation result having undergone the transformation processing at a predetermined address in the RAM 100 in accordance with the operation result storage destination pointer and the reference data size, which are described in the register group 702. Note that if the accumulated value of the convolution operation results by a plurality of pairs of filter kernels in the horizontal and vertical directions is calculated, the accumulators respectively execute accumulation of the convolution operation results by the plurality of pairs of filter kernels in the horizontal and vertical directions. Upon completion of the accumulation of the convolution operation results by the plurality of pairs of filter kernels in the horizontal and vertical directions, the calculation results of the accumulators 214 are parallelly loaded into the shift register 206, as described above. Processing after the processing of parallelly loading the results of the accumulators into the shift register 206 in accordance with the Load5 signal is the same as the above-described processing contents.

The controller 201 arbitrates access to the RAM 100 by the storage units 202 and 203 of the first product-sum calculation circuit 200, and access to the RAM 100 by the storage unit 210 of the second product-sum calculation circuit 220. Furthermore, the controller 201 arbitrates access to the RAM 100 by the non-linear transformation unit 209, and performs pipeline processing of product-sum calculation processing and access to the RAM 100 by the four processing units (202, 203, 210, and 209). For example, consider a case in which the kernel sizes of the filters in the horizontal and vertical directions are "24" and the operation parallelism is 12. "The number (24) of clocks necessary for a product-sum calculation of the filter kernel in the horizontal direction and that of the filter kernel in the vertical direction" is larger than "the number of clocks for loading the weighting coefficients (3)×2+the number of clocks for loading the reference data (9)+the number of clocks for storing result data (1)". Thus, the time taken for memory access is concealed in the product-sum calculation time.

Note that since the non-linear transformation unit 209 has an access frequency to the RAM 100, which is lower than those of the storage units 202, 203, and 210, it operates at the lowest priority level. That is, the non-linear transformation unit 209 accesses the RAM 100 during a time slot as an interval between the access operations of the storage units 202, 203, and 210.

In the first embodiment, readout of the reference data, readout of the weighting coefficient data, and writing of the operation results for the RAM 100 are parallelly executed during the product-sum calculation processing period. Therefore, convolution operation processes, the number of which corresponds to the parallelism, are completed by clocks, the number of which is equal to "product-sum calculation time (filter kernel horizontal size+filter kernel vertical size)+load time into shift registers (horizontal direction filter kernel size)"×"number of feature planes in previous layer to be connected".

If, for example, the size of the filter kernel is small, access operations to the RAM 100 cannot be completely implemented by pipeline processing during the product-sum calculation period depending on the relationship between the parallelism and the filter kernel. In this case, the controller 201 prioritizes completion of access to the RAM 100. It is then possible to delay the start of the product-sum calculation processing by controlling the Enable1, Enable2, Enable3, Enable4, and Enable5 signals and the Latch Enable signals of the accumulators. That is, it is possible to load data into the storage units 202, 203, and 210, and save data of the non-linear transformation unit 209.

Figures 16A, 16B, 16C:
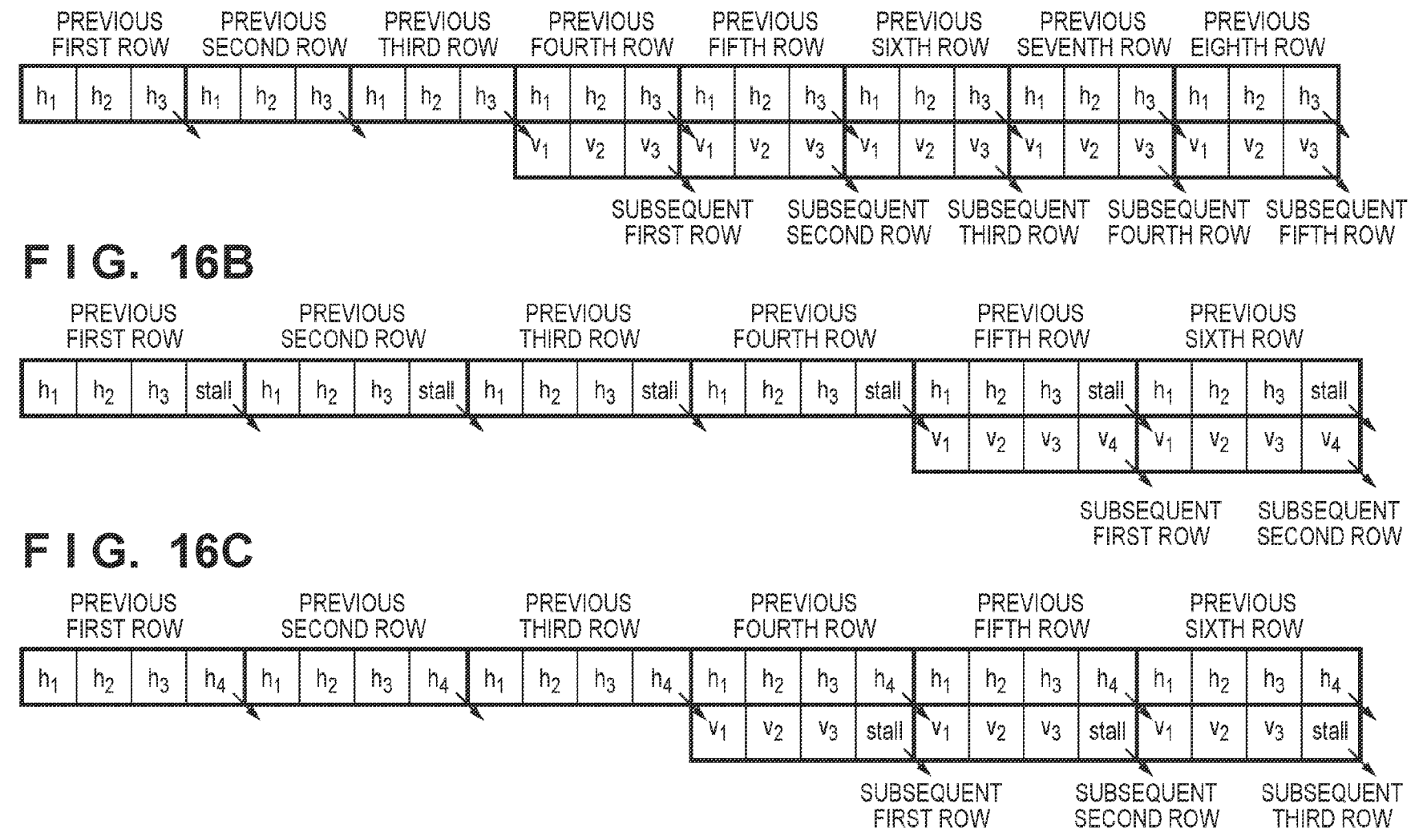

FIG. 16A is a schematic view for explaining the timing of the pipeline operation of the product-sum calculation processing in the first product-sum calculation circuit 200 and the product-sum calculation processing in the second product-sum calculation circuit 220 according to the first embodiment. FIG. 16A shows a case in which the sizes of the filter kernels in the horizontal and vertical directions are "3" because of a paper space.

In FIG. 16A, reference symbols h1 to h3 denote filter coefficients of the filter kernel in the horizontal direction in the first product-sum calculation circuit 200. By one clock indicated by the width of each square in which each filter coefficient is described, a product-sum calculation using the filter coefficient is executed. Reference symbols v1 to v3 denote filter coefficients of the kernel in the vertical direction in the second product-sum calculation circuit 220. Within one clock indicated by the width of each square in which each filter coefficient is described, a product-sum calculation using the filter coefficient is executed.

As described above, the first product-sum calculation circuit 200 executes the product-sum calculation using each of the filter coefficients h1 to h3 for each clock. An operation of reference data for one line is completed by three clocks coincident with the kernel size of the filter, and a product-sum calculation result is output to the second product-sum calculation circuit 220. In the second product-sum calculation circuit 220, with respect to data for three lines input from the first product-sum calculation circuit 200, an operation of reference data for three lines is completed by three clocks coincident with the kernel size of the filter. In FIG. 16A, the timing at which each calculated product-sum calculation result is output is indicated by an arrow.

As described above, the product-sum calculation processing in the first product-sum calculation circuit 200 and that in the second product-sum calculation circuit 220 are executed as pipeline processing, as shown in FIG. 16A.

Interrupt processing which is executed upon end of the convolution operation processing will be described next.

FIG. 10B is a flowchart illustrating an operation at the time of interrupt processing by the CPU 127.

At the time of interrupt processing, upon receiving the end notification interrupt from the controller 201, the CPU 127 activates the DMAC 126 and transfers the last feature plane data of the RAM 100 to the RAM 129 on the CPU bus 130 in step S1010. The CPU 127 acquires information such as the position and size of a predetermined object as a detection target from the last layer detection result stored in the RAM 129. More specifically, the CPU 127 performs binarization processing for the last detection result, thereby extracting the object position and size and the like by processing such as labeling processing. The series of processes then ends.

According to the first embodiment, an operation and memory access can be implemented by pipeline processing for each filter kernel size by a small circuit scale (register size or the like). It is then possible to execute, at high speed, a hierarchical convolution operation by decomposing the filter kernel having the two-dimensional structure into the two filter kernels respectively having the one-dimensional structures in the horizontal and vertical directions. Since the reference data and operation result data are arranged on the same memory, it is possible to flexibly perform a complicated hierarchical convolution operation processing by only register setting.

That is, it is possible to execute a hierarchical convolution operation at high speed with a low cost, and to reduce the power consumption. It is also possible to execute a convolution operation including various hierarchical connections at high speed by the same circuit.

Second Embodiment

The second embodiment of the present invention will be described next. An operation apparatus according to the second embodiment is different from that according to the first embodiment in that the kernel sizes of filters in the horizontal and vertical directions are different from each other. The remaining arrangement and the like are the same as those in the first embodiment. Only points different from the first embodiment will be described in the second embodiment, and the rest is the same as in the first embodiment and a description thereof will be omitted. In the second embodiment, the kernel size of the filter in the horizontal direction is "4" and the kernel size of the filter in the vertical direction is "3".

In the convolution operation apparatus described in the first embodiment, the first product-sum calculation circuit 200 and the second product-sum calculation circuit 220 perform a pipeline operation, as described with reference to FIG. 16A. As in the second embodiment, however, if the kernel sizes of the filters in the horizontal and vertical directions are different from each other, the step count of product-sum calculation processing in a first product-sum calculation circuit 200 and that of product-sum calculation processing in a second product-sum calculation circuit 220 are not equal to each other. That is, in the first product-sum calculation circuit 200, a product-sum calculation is completed while a shift register 205 shifts reference data four times. To the contrary, in the second product-sum calculation circuit 220, a product-sum calculation is completed while a ring buffer 212 shifts reference data three times. As described above, in the second embodiment, there is a difference of (4−3=) 1 between the step counts of the product-sum calculation processes in the first product-sum calculation circuit 200 and second product-sum calculation circuit 220. In the second embodiment, as shown in FIG. 16C, a stall in which no operation is executed is inserted to the operation processing of the second product-sum calculation circuit 220 during the pipeline processing controlled by the controller 201. As is apparent from FIG. 16C, with this processing, the timing at which the product-sum calculation processing is completed in the first product-sum calculation circuit 200 can be made coincide with the timing at which the product-sum calculation processing is completed in the second product-sum calculation circuit 220. Note that the second embodiment has explained a case in which the kernel size of the filter in the horizontal direction is larger than that of the filter in the vertical direction. Conversely, if the kernel size of the filter in the vertical direction is larger than that of the filter in the horizontal direction, stall stages, the number of which is equal to the difference between the step counts of the product-sum calculation processes, can be inserted to the operation stage of the first product-sum calculation circuit 200, as shown in FIG. 16B. The kernel sizes of the filters in the horizontal and vertical directions are not limited to those in the above example and arbitrary sizes may be used, as a matter of course. In this case, stall stages corresponding to the difference between the kernel sizes of the filters in the horizontal and vertical directions are inserted.

As described above, according to the second embodiment, even if the kernel sizes of the filters in the horizontal and vertical directions are different, a hierarchical convolution operation can be executed at high speed with a low cost. Furthermore, it is possible to reduce the power consumption. It is also possible to execute a convolution operation including various hierarchical connections at high speed by the same circuit.

Third Embodiment

The third embodiment of the present invention will be described next. A convolution operation apparatus according to the third embodiment is different from that according to the first embodiment in that the first product-sum calculation circuit 200 of the first embodiment is subsequently series-connected to a second product-sum calculation circuit 220, and the remaining arrangement and the like are the same as those in the first embodiment. Only points different from the first embodiment will be described in the third embodiment, and the rest is the same as in the first embodiment and a description thereof will be omitted.

Figure 17:
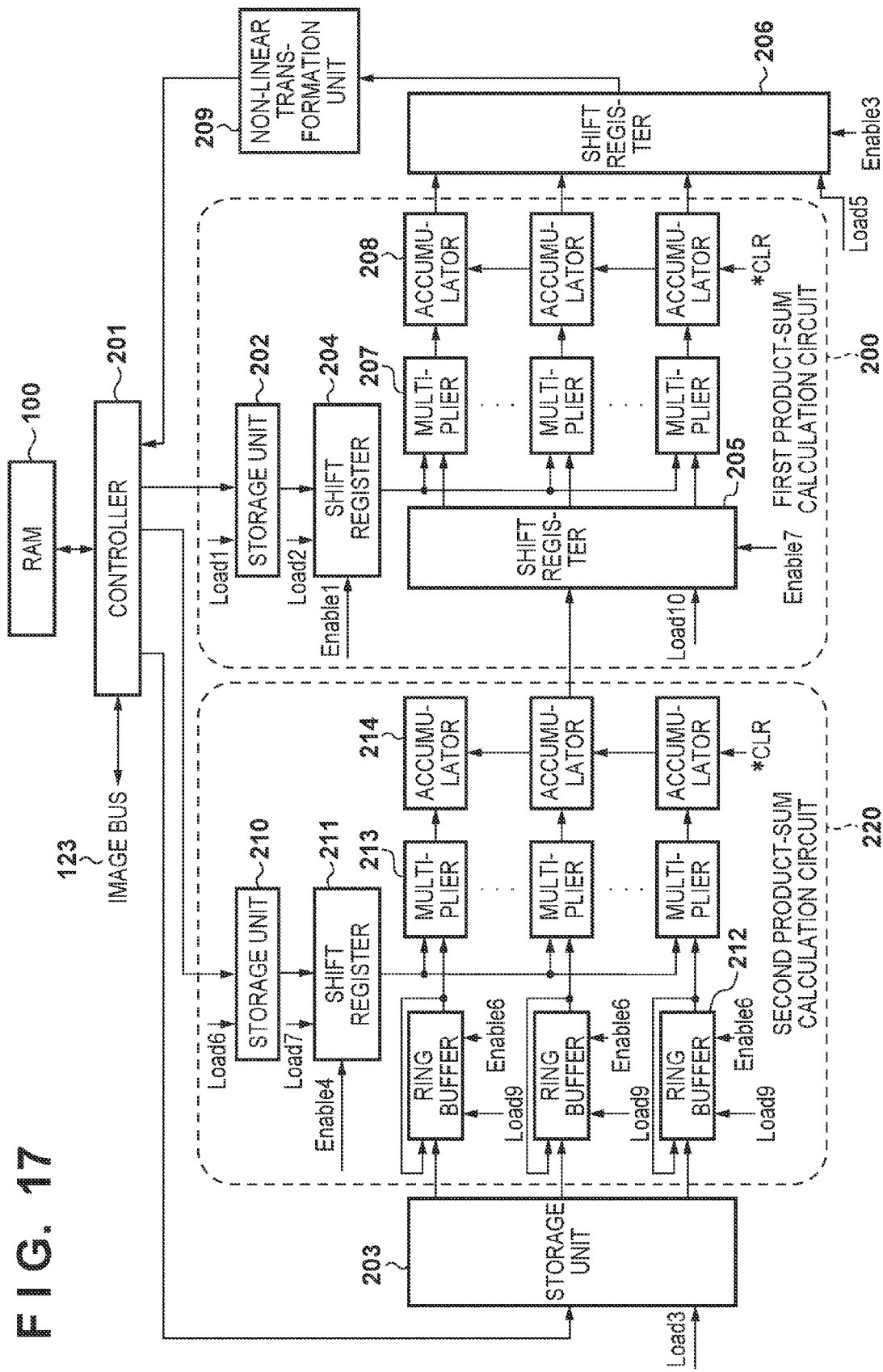
FIG. 17 is a block diagram for explaining the arrangement of a CNN processing unit according to the third embodiment of the present invention.

FIG. 17 is a block diagram for explaining the arrangement of a CNN processing unit 122 according to the third embodiment of the present invention. In this example, a first product-sum calculation circuit 200 is subsequently series-connected to the second product-sum calculation circuit 220. Note that in FIG. 17, the same reference numerals as those in FIG. 2 of the above-described first embodiment denote common parts.

Referring to FIG. 17, reference data held in a storage unit 203 are loaded into ring buffers 212 of the second product-sum calculation circuit 220 at once. Reference data held in accumulators 214 of the second product-sum calculation circuit 220 are loaded into a shift register 205 of the first product-sum calculation circuit 200 at once. The above differences from the first embodiment will be described in more details.

Figure 18:
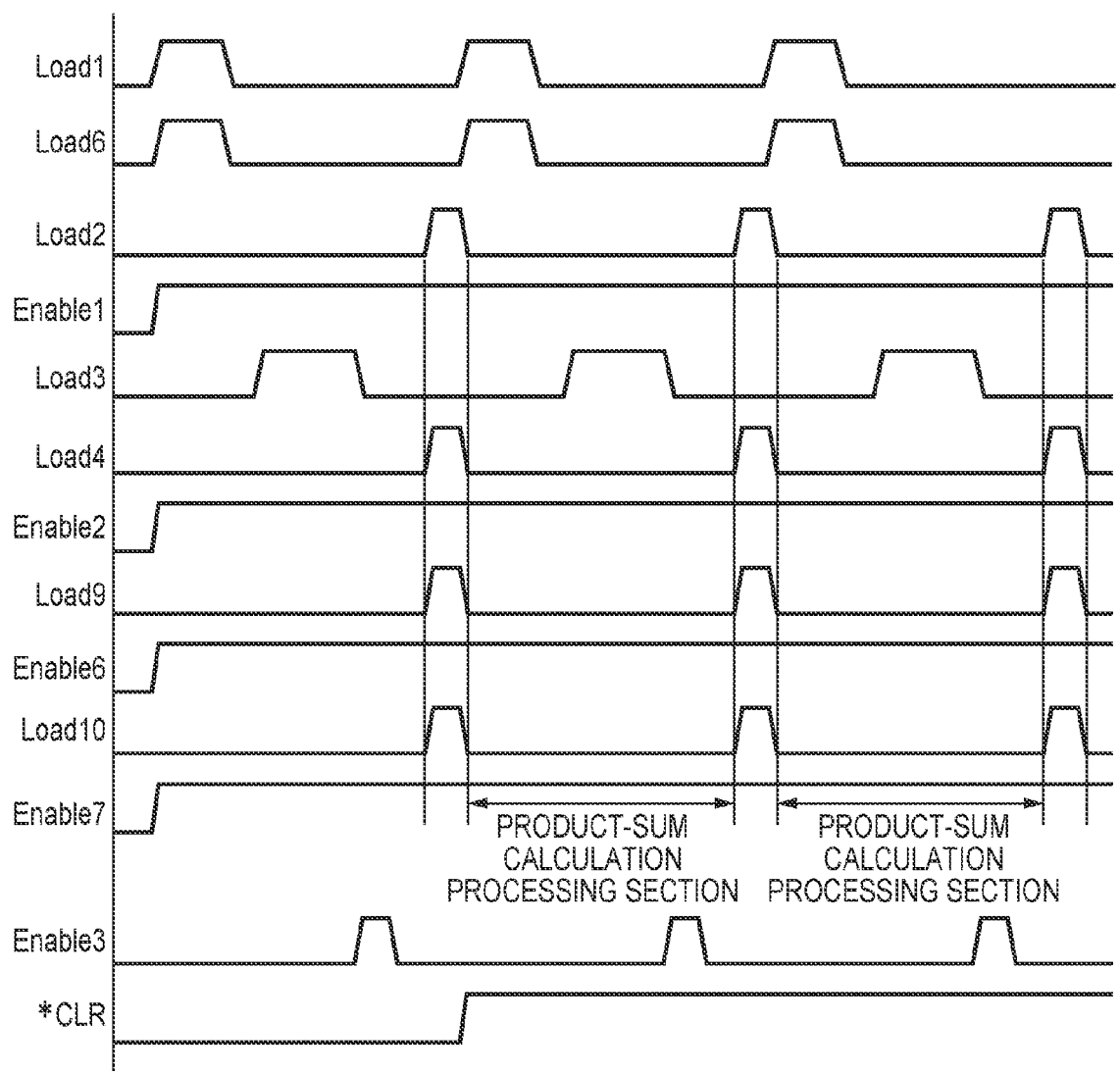
FIG. 18 is a timing chart for explaining an operation at the time of convolution operation processing according to the third embodiment.

FIG. 18 is a timing chart for explaining an operation at the time of convolution operation processing according to the third embodiment. FIG. 18 shows part of the operation (step S1004) of convolution operation processing of one feature plane data. Signals shown in FIG. 18 are synchronously operated based on a clock signal (not shown).

A Load9 signal is a signal for instructing initialization of the first registers of the ring buffers 212. If the Load9 signal is 1 and an Enable6 signal is valid (1), the reference data held in the storage unit 203 are loaded into the first registers of the ring buffers 212 at once. Note that the Enable6 signal is a signal for controlling the data shifts of the ring buffers 212, and is set to 1 all the time during the operation, as shown in FIG. 18. Therefore, if the Load9 signal is set to 1, each ring buffer 212 latches the output from the storage unit 203 in response to the clock signal. Alternatively, if the Load9 signal is 0, each ring buffer 212 continues ring shift processing in response to the clock signal.

If the number of clocks corresponding to the kernel size of a filter in the vertical direction is counted, a sequence controller 701 of a controller 201 enables the Load9 signal (sets the Load9 signal to 1), thereby stopping the shift operations of the ring buffers 212. At the same time, the sequence controller 701 loads the reference data held in the storage unit 203 into the ring buffers 212 at once. That is, the sequence controller 701 loads necessary reference data into the ring buffers 212 at once for each filter kernel, and shifts the loaded reference data in a ring in response to an operation clock. The controller 201 controls the Load9 signal at the same timing as that of the Load7 signal for controlling the weighting coefficient data described in the first embodiment.

Each accumulator 214 continues the product-sum calculation in synchronism with the clock. Therefore, product-sum calculation processes according to the kernel size are simultaneously executed for a plurality of points of feature plane data to be calculated in accordance with the shift operations of a shift register 211 and the ring buffers 212. This is the same as in the first embodiment. More specifically, during the shift operation periods (product-sum calculation processing sections in FIG. 18) of the shift register 211 and ring buffers 212, a product-sum calculation for the filter kernel in the vertical direction is performed. Such operation for each filter kernel in the vertical direction is repeated in the vertical direction while interchanging the weighting coefficient data and the reference data, thereby generating convolution operation results according to the number of the parallelism. The controller 201 controls the respective signals in accordance with the filter kernel size and the parallelism, and parallelly executes product-sum calculation processing and processing of supplying data (weighting coefficient data) necessary for the product-sum calculation processing from the RAM 100.

A Load10 signal is a signal for instructing initialization of the shift register 205. If the Load10 signal is 1 and an Enable7 signal is valid (at a signal level of 1), the reference data held in the accumulators 214 of the second product-sum calculation circuit 220 are loaded into the shift register 205 at once. Note that the Enable7 signal is a signal for controlling the data shift of the shift register 205, and is set to 1 all the time during the operation, as shown in FIG. 18. Therefore, if the Load10 signal is 1, the shift register 205 latches the outputs from the accumulators 214 of the second product-sum calculation circuit 220 in response to the clock signal. Alternatively, if the Load10 signal is 0, the shift register 205 continues the shift processing in response to the clock signal.

When the number of clocks corresponding to the kernel size of the filter in the horizontal direction is counted, the sequence controller 701 of the controller 201 enables the Load10 signal, thereby stopping the shift operation of the shift register 205. At the same time, the sequence controller 701 loads the reference data held in the accumulators 214 of the second product-sum calculation circuit 220 into the shift register 205 at once. That is, the sequence controller 701 loads necessary reference data into the shift register 205 at once for each filter kernel in the horizontal direction, and shifts the loaded reference data in response to an operation clock. The controller 201 controls the Load10 signal at the same timing as that of the Load2 signal for controlling the weighting coefficient data described in the first embodiment.

Each accumulator 208 continues the product-sum calculation in synchronism with the clock. Therefore, product-sum calculation processes according to the kernel size of the filter are simultaneously executed for a plurality of points of feature plane data to be calculated in accordance with the shift operations of a shift register 204 and the shift register 205. This is the same as in the first embodiment. More specifically, during the shift operation periods (product-sum calculation processing sections in FIG. 18) of the shift registers 204 and 205, a product-sum calculation for the filter kernel in the horizontal direction is performed. Such operation in the horizontal direction unit is repeated in the horizontal direction while interchanging the weighting coefficient data and the reference data, thereby generating a convolution operation result according to the parallelism. The controller 201 controls the respective signals in accordance with the filter kernel size and the parallelism, and parallelly executes product-sum calculation processing and processing of supplying data (weighting coefficient data and reference data) necessary for the product-sum calculation processing from the RAM 100.

As described above, according to the third embodiment, the first product-sum calculation circuit 200 is subsequently series-connected to the second product-sum calculation circuit 220. A hierarchical convolution operation can be executed at high speed with a low cost using the convolution operation apparatus according to the third embodiment, similarly to the first embodiment. Furthermore, it is possible to reduce the power consumption. It is also possible to execute a convolution operation including various hierarchical connections at high speed by the same circuit.

Fourth Embodiment

The fourth embodiment of the present invention will be described next. A CNN processing unit according to the fourth embodiment is different from that according to the first embodiment in that a third product-sum calculation circuit 1900 having the same arrangement as that of the second product-sum calculation circuit 220 of the first embodiment is subsequently series-connected to a second product-sum calculation circuit 220. The remaining arrangement and the like are the same as those in the first embodiment. Only points different from the aforementioned first embodiment will be described in the fourth embodiment, and the rest is the same as in the first embodiment and a description thereof will be omitted.

Figure 19:
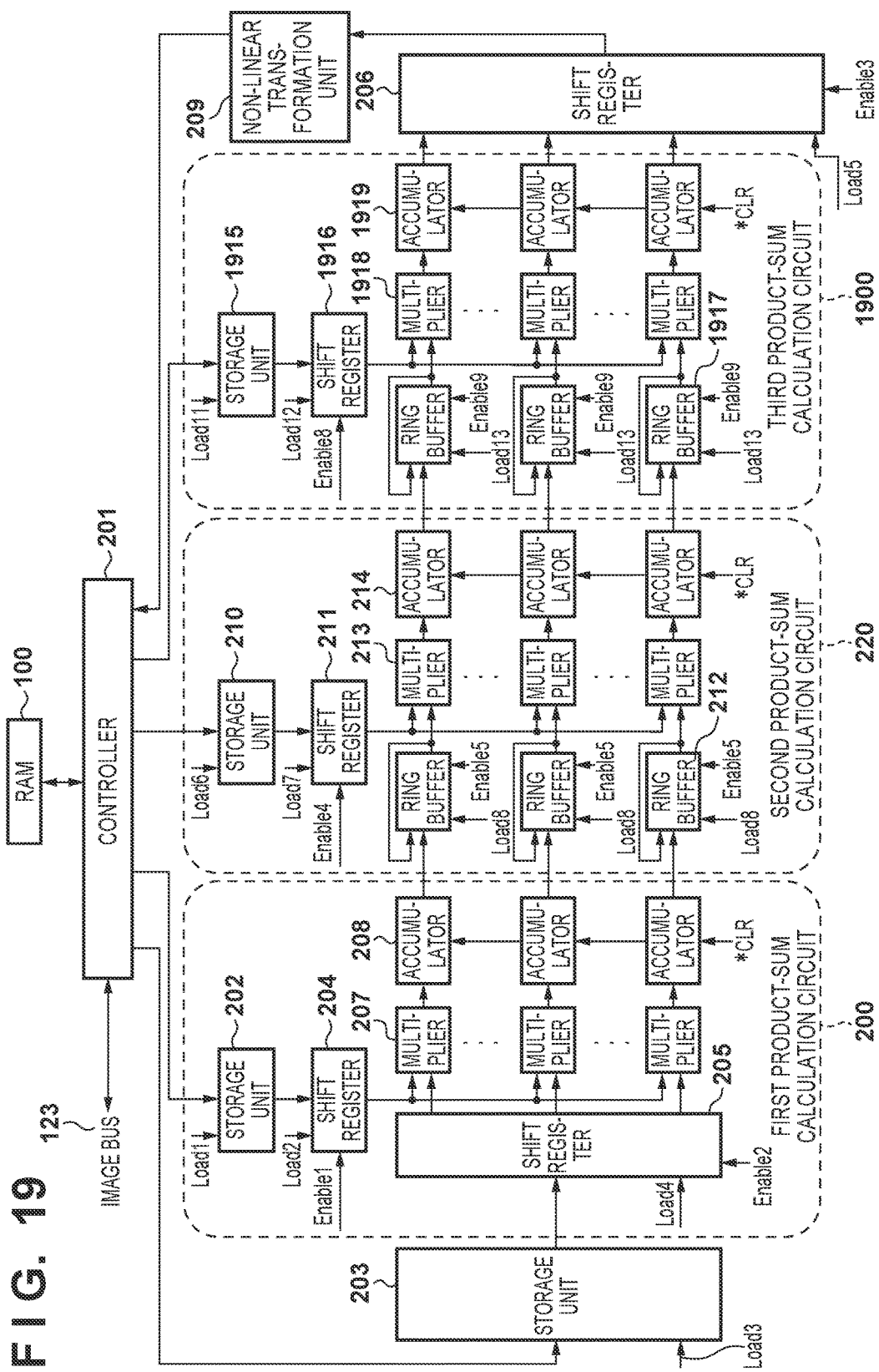
FIG. 19 is a block diagram for explaining the arrangement of a CNN processing unit according to the fourth embodiment.

FIG. 19 is a block diagram for explaining the arrangement of a CNN processing unit 122 according to the fourth embodiment. In this example, the third product-sum calculation circuit 1900 is subsequently series-connected to the second product-sum calculation circuit 220. The third product-sum calculation circuit 1900 has the same arrangement as that of the second product-sum calculation circuit 220.

A convolution operation according to the fourth embodiment will be described next. In convolution operation processing according to the fourth embodiment, a convolution operation is executed by decomposing a plurality of filter kernels respectively having two-dimensional structures and respectively corresponding to a plurality of feature plane data into three filter kernels respectively having one-dimensional structures in the horizontal, vertical, and feature plane directions. It is known that the weighting coefficient matrix of a filter kernel having a three-dimensional structure (horizontal, vertical, and feature plane data directions) can be approximated by multiplication using filter kernels respectively having the one-dimensional structures in the horizontal, vertical, and feature plane directions, given by:

$$\text{output}(x, y) = \sum_{\substack{featureIndex=0}}^{featureSize-1} \sum_{row=0}^{rowSize-1} \sum_{column=0}^{columnSize-1} (\text{input}(x + column, y + row, \text{feature}) \times weight_{horizontal}(column) \times weight_{vertical}(row) \times weight_{feature}(featureIndex)) \quad (4)$$

Note that in fact, a method is often used in which the approximation accuracy is improved by obtaining the total of filter operation results using a combination of a plurality of filter kernels in the horizontal, vertical, and feature plane directions, given by:

$$\text{output}(x, y) = \sum_{pair=0}^{pairSize-1} \sum_{featureIndex=0}^{featureSize-1} \sum_{row=0}^{rowSize-1} \sum_{column=0}^{columnSize-1} (\text{input}(x + column, y + row, \text{feature}) \times weight_{pair,horizontal}(column) \times weight_{pair,vertical}(row) \times weight_{pair,feature}(featureIndex)) \quad (5)$$

where a subscript "pair" represents the combination of the filter kernels.

The method is described in detail in Denton and a more detailed description will be omitted. A convolution operation method for executing equations (4) and (5) will be described next.

Operation processing in a first product-sum calculation circuit 200 and that in the second product-sum calculation circuit 220 are executed in the same way as in the first embodiment and a description thereof will be omitted. Operation processing in the third product-sum calculation circuit 1900 is executed in the same way as in the second product-sum calculation circuit 220 described in the first embodiment. Components denoted by reference numerals 1915 to 1919 of the third product-sum calculation circuit 1900 are the same as those denoted by reference numerals 210 to 214 of the second product-sum calculation circuit 220, respectively, and a description thereof will be omitted.

Figure 20:
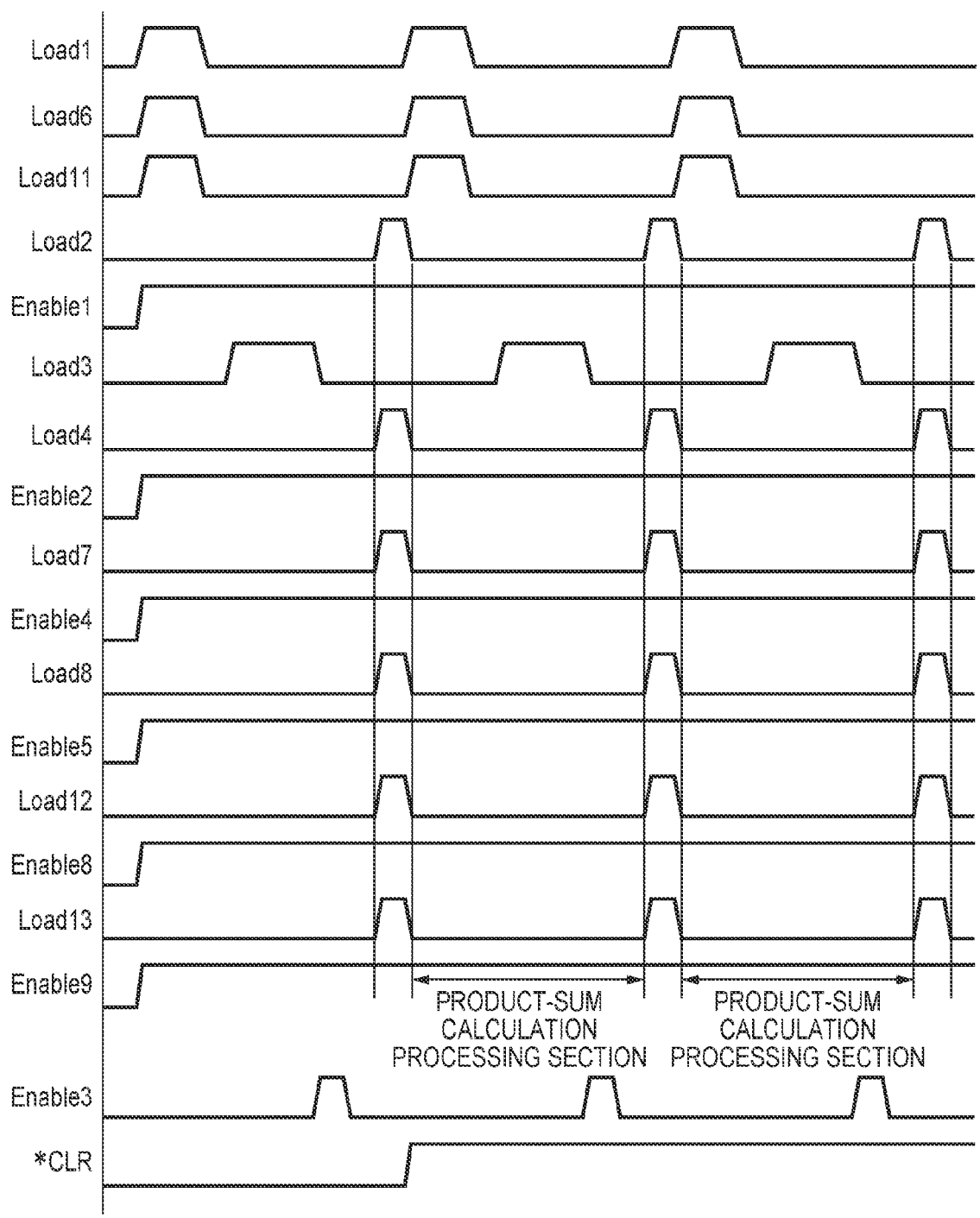
FIG. 20 is a timing chart for explaining an operation at the time of convolution operation processing according to the fourth embodiment.

FIG. 20 is a timing chart for explaining an operation at the time of convolution operation processing according to the fourth embodiment. FIG. 20 shows part of the operation (step S1004) of the convolution operation processing of one feature plane data. Signals shown in FIG. 20 synchronously operate based on a clock signal (not shown).

A Load11 signal is an enable signal for loading weighting coefficient data into the storage unit 1915. While the Load11 signal is valid (at a signal level of 1), a controller 201 reads out weighting coefficient data in the feature plane direction from a RAM 100, and writes them in the storage unit 1915. The kernel size of a filter in the feature plane direction is held in a register group 702. Based on a weighting coefficient storage destination pointer, kernel size, and reference data plane count which are designated in the register group 702, the controller 201 determines the address of weighting coefficient data to be read out. Assume that the data width of the RAM 100 is 32 bits, and the data width of each weighting coefficient data is 8 bits. Thus, when writing five weighting coefficient data in the feature plane direction in the storage unit 1915, load processing is completed by three clocks. Note that a readout and writing cycle for the RAM 100 is all completed by one clock.

A *CLR signal is a signal for initializing the accumulators 1919 of the third product-sum calculation circuit 1900. If the *CLR signal is 0, registers 502 (FIG. 5) of the accumulators 1919 are initialized to 0. Before the start of the convolution operation of new feature plane data, the controller 201 sets the *CLR signal to 0. A Load12 signal is a signal for instructing initialization of the shift register 1916. If the Load12 signal is 1 and an Enable8 signal is valid (at a signal level of 1), the plurality of weighting coefficient data held in the storage unit 1915 are loaded into the shift register 1916 at once. The Enable8 signal is a signal for controlling the data shift of the shift register 1916, and is set to 1 all the time during the operation, as shown in FIG. 20. Therefore, if the Load12 signal is 1, the shift register 1916 latches the output from the storage unit 1915 in response to the clock signal. If the Load12 signal is 0, the shift register 1916 continues the shift processing in response to the clock signal. When the number of clocks corresponding to the kernel size of the filter is counted, the sequence controller 701 of the controller 201 enables the Load12 signal, thereby stopping the shift operation of the shift register 1916. At the same time, the sequence controller 701 loads the weighting coefficient data held in the storage unit 1915 into the shift register 1916 at once. That is, the sequence controller 701 loads the weighting coefficient data into the shift register 1916 at once in the feature plane direction unit of the filter kernel, and shifts out the loaded coefficients in response to an operation clock.

A Load13 signal is a signal for instructing initialization of first registers of the ring buffers 1917. If the Load13 signal is 1 and an Enable9 signal is valid (at a signal level of 1), reference data held in the accumulators 214 of the second product-sum calculation circuit 220 are loaded into the first registers of the ring buffers 1917 at once. Note that the Enable9 signal is a signal for controlling the data shifts of the ring buffers 1917, and is set to 1 all the time during the operation, as shown in FIG. 20. Therefore, if the Load13 signal is 1, the ring buffers 1917 respectively latch the outputs from the accumulators 214 of the second product-sum calculation circuit 220 in response to the clock signal. Alternatively, if the Load13 signal is 0, the ring buffers 1917 respectively continue the ring shift processes in response to the clock signal. When the number of clocks corresponding to the kernel size of the filter in the feature plane direction is counted, the sequence controller 701 of the controller 201 enables the Load13 signal, thereby stopping the shift operations of the ring buffers 1917. At the same time, the sequence controller 701 loads the reference data held in the accumulators 214 of the second product-sum calculation circuit 220 into the ring buffers 1917 at once, respectively. That is, the sequence controller 701 loads necessary reference data into the ring buffers 1917 at once for each filter kernel, and shifts the loaded reference data in response to an operation clock. In this way, the controller 201 controls the Load13 signal at the same timing as that of the Load12 signal.

Each accumulator 1919 continues the product-sum calculation in synchronism with the clock. Therefore, product-sum calculation processes according to the kernel size of the filter are simultaneously executed for a plurality of points of feature plane data to be calculated in accordance with the shift operations of the shift register 1916 and ring buffers 1917. More specifically, during the shift operation periods (product-sum calculation processing sections in FIG. 20) of the shift register 1916 and ring buffers 1917, a product-sum calculation for the kernel in the feature plane direction is performed. Such operation for each kernel in the feature plane direction is repeated while interchanging the weighting coefficient data and the reference data, thereby generating convolution operation results according to the number of the parallelism. The controller 201 controls the respective signals in accordance with the filter kernel size and the parallelism, and parallelly executes product-sum calculation processing and processing of supplying data (weighting coefficient data) necessary for the product-sum calculation processing from the RAM 100.

A Load5 signal is a signal for parallelly loading the results of the accumulators 1919 of the third product-sum calculation circuit 1900 into a shift register 206. Upon end of the product-sum calculation of the filter kernel in the feature plane direction, the controller 201 sets the Load5 signal (not shown) and the Enable3 signal to 1. If the Load5 signal is 1 and the Enable3 signal is 1, the shift register 206 loads the outputs from the accumulators 1919 at once. Note that in FIG. 20, the calculated convolution operation results have been latched into the shift register 206. If data loading to storage units 202 and 203 and the storage units 210 and 1915 is complete during the shift operations of the shift register 1916 and the ring buffers 1917, the controller 201 enables the Enable3 signal. This shifts out the calculation results held in the shift register 206. That is, a signal OUTn (the last output from the shift register 206) is output to a non-linear transformation unit 209. The shifted-out calculation result undergoes transformation processing by the non-linear transformation unit 209. After that, the controller 201 stores the resultant data at a predetermined address in the RAM 100 in accordance with an operation result storage destination pointer and reference data size, which are described in the register group 702.

Note that the accumulated value of the convolution operation results by a plurality of sets of filter kernels in the horizontal, vertical, and feature plane directions is calculated as indicated by equation (5), as described above. At this time, the accumulators 1919 respectively execute accumulation of the convolution operation results by the plurality of sets of filter kernels in the horizontal, vertical, and feature plane directions. Upon completion of the accumulation of the convolution operation results by the plurality of sets of filter kernels in the horizontal, vertical, and feature plane directions, the calculation results of the accumulators 1919 are parallelly loaded into the shift register 206, as described above. Processing after the processing of parallelly loading the results of the accumulators 1919 into the shift register 206 in accordance with the Load5 signal is the same as the above-described processing contents.

The controller 201 arbitrates access to the RAM 100 by the storage units 202 and 203 of the first product-sum calculation circuit 200, and access to the RAM 100 by the storage unit 210 of the second product-sum calculation circuit 220. Furthermore, the controller 201 arbitrates access to the RAM 100 by the storage unit 1915 of the third product-sum calculation circuit 1900, and access to the RAM 100 by the non-linear transformation unit 209. Thus, the controller 201 performs pipeline processing of product-sum calculation processing and access to the RAM 100 by these processing units (202, 203, 209, 210, and 1915).

For example, consider a case in which the kernel sizes of the filters in the horizontal, vertical, and feature plane directions are 24 and the operation parallelism is 12. "The number of clocks necessary for a product-sum calculation of the filter kernel in the horizontal direction, that of the filter kernel in the vertical direction, and that of the filter kernel in the feature plane direction" (24) is larger than "the number of clocks for loading the weighting coefficients (3)×3+the number of clocks for loading the reference data (9)+the number of clocks for storing result data (1)". Thus, the time taken for access to the RAM 100 is concealed in the product-sum calculation time, similarly to the first embodiment. Note that since the non-linear transformation unit 209 has an access frequency to the RAM 100, which is lower than those of the storage units 202, 203, 210, and 1915, it operates at the lowest priority level. That is, the non-linear transformation unit 209 accesses the RAM 100 during a time slot as an interval between the access operations to the storage units 202, 203, 210, and 1915.

In the fourth embodiment, readout of the reference data, readout of the weighting coefficient data, and writing of the calculation results for the RAM 100 are parallelly executed during the product-sum calculation processing period. Therefore, convolution operation processes, the number of which corresponds to the parallelism, are completed by clocks, the number of which is equal to "product-sum calculation time (horizontal direction filter kernel size+ vertical direction filter kernel size+feature plane direction filter kernel size)+load time into shift registers (horizontal direction filter kernel size)"×"number of feature planes in previous layer to be connected".

If, for example, the filter kernel size is small, access operations to the RAM 100 cannot be completely implemented by pipeline processing during the product-sum calculation period depending on the relationship between the parallelism and the filter kernel. In this case, the controller 201 prioritizes completion of access to the RAM 100. It is then possible to delay the start of the product-sum calculation processing by controlling the Enable1 to Enable5, Enable8, and Enable9 signals, and the Latch Enable signals of the accumulators. That is, it is possible to load data into the storage units 202, 203, 210, and 1915, and save data of the non-linear transformation unit 209.

Figure 21:
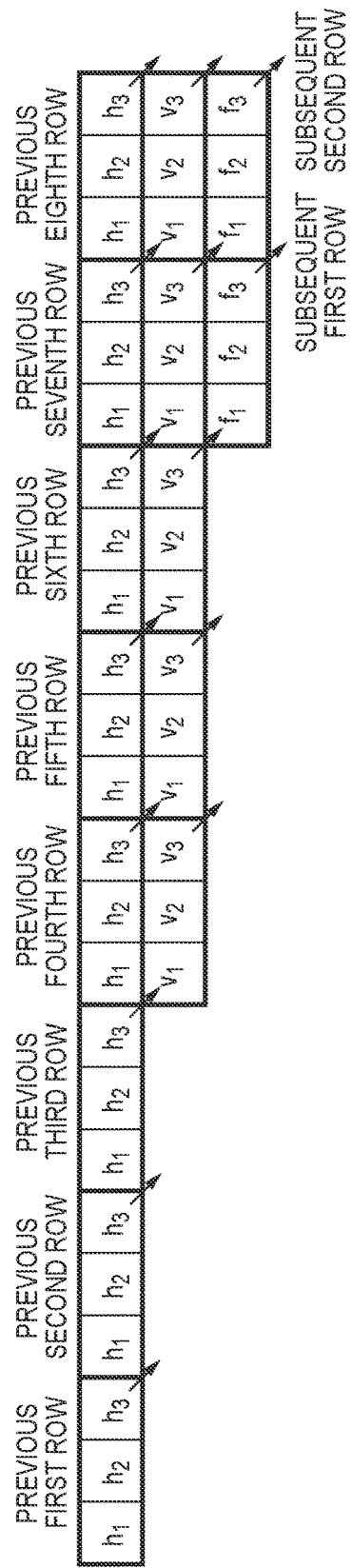
FIG. 21 is a schematic view showing a pipeline operation of product-sum calculation processing by the first product-sum calculation circuit, product-sum calculation processing by the second product-sum calculation circuit, and product-sum calculation processing by the third product-sum calculation circuit according to the fourth embodiment.

FIG. 21 is a schematic view showing the pipeline operation of the product-sum calculation processing in the first product-sum calculation circuit 200, that in the second product-sum calculation circuit 220, and that in the third product-sum calculation circuit 1900 according to the fourth embodiment. Note that FIG. 21 shows a case in which the sizes of the filter kernels in the horizontal, vertical, and feature plane directions are 3 because of a paper space.

In FIG. 21, reference symbols h1 to h3 denote weighting coefficient data of the filter kernel in the horizontal direction in the first product-sum calculation circuit 200. Within one clock indicated by the width of each square in which each coefficient data is described, a product-sum calculation using the coefficient data is executed. Reference symbols v1 to v3 denote weighting coefficient data of the filter in the vertical direction in the second product-sum calculation circuit 220. Within one clock indicated by the width of each square in which each coefficient data is described, a product-sum calculation using the coefficient data is executed. Reference symbols f1 to f3 denote weighting coefficient data of the filter in the feature plane direction in the third product-sum calculation circuit 1900. Within one clock indicated by the width of each square in which each coefficient data is described, a product-sum calculation using the coefficient data is executed.

As described above, the first product-sum calculation circuit 200 executes the product-sum calculation using each of the coefficient data h1 to h3 for each clock. An operation of reference data for one line is completed by three clocks coincident with the kernel size of the filter, and a product-sum calculation result is output to the second product-sum calculation circuit 220. In the second product-sum calculation circuit 220, with respect to data for three lines input from the first product-sum calculation circuit 200, an operation of reference data for three lines is completed by three clocks coincident with the kernel size of the filter. In the third product-sum calculation circuit 1900, with respect to the data for the three lines input from the second product-sum calculation circuit 220, an operation of reference data for three lines is completed by three clocks coincident with the kernel size of the filter. In FIG. 21, the timing at which each calculated product-sum calculation result is output is indicated by an arrow.

As described above, the product-sum calculation processing in the first product-sum calculation circuit 200, that in the second product-sum calculation circuit 220, and that in the third product-sum calculation circuit 1900 are executed as pipeline processing, as shown in FIG. 21. Note that interrupt processing which is executed upon end of the convolution operation processing is the same as in the first embodiment and a description thereof will be omitted.

Note that in the above-described fourth embodiment, the second product-sum calculation circuit 220 may execute an operation related to the kernel of the filter in the feature plane direction, and the third product-sum calculation circuit 1900 may execute an operation related to the kernel of the filter in the vertical direction. In this case, the above-described operation method is the same except that the kernels of the filters to be used for operation in the product-sum calculation circuits are exchanged.

As described in the above third embodiment, the first product-sum calculation circuit 200 may be subsequently series-connected to the second product-sum calculation circuit 220 or the third product-sum calculation circuit 1900.

As described above, according to the fourth embodiment, an operation and memory access can be implemented by pipeline processing for each filter kernel size by a small circuit scale (register size or the like). It is then possible to execute, at high speed, a hierarchical convolution operation by decomposing the filter kernel having the three-dimensional structure into the three filter kernels respectively having the one-dimensional structures in the horizontal, vertical, and feature plane directions. Since the reference data and operation result data are arranged in the same memory space, it is possible to flexibly perform a complicated hierarchical convolution operation processing by only register setting. That is, it is possible to execute a hierarchical convolution operation at high speed with a low cost, thereby reducing the power consumption. It is also possible to execute a convolution operation including various hierarchical connections at high speed by the same circuit.

Fifth Embodiment

The fifth embodiment of the present invention will be described next. A convolution operation apparatus according to the fifth embodiment is different from that according to the fourth embodiment in that a fourth product-sum calculation circuit having the same arrangement as that of a second product-sum calculation circuit 220 is subsequently series-connected to a third product-sum calculation circuit 1900, and the remaining arrangement and the like are the same as those in the fourth embodiment. Only points different from the fourth embodiment will be described in the fifth embodiment, and the rest is the same as in the first embodiment and a description thereof will be omitted.

Figure 22:
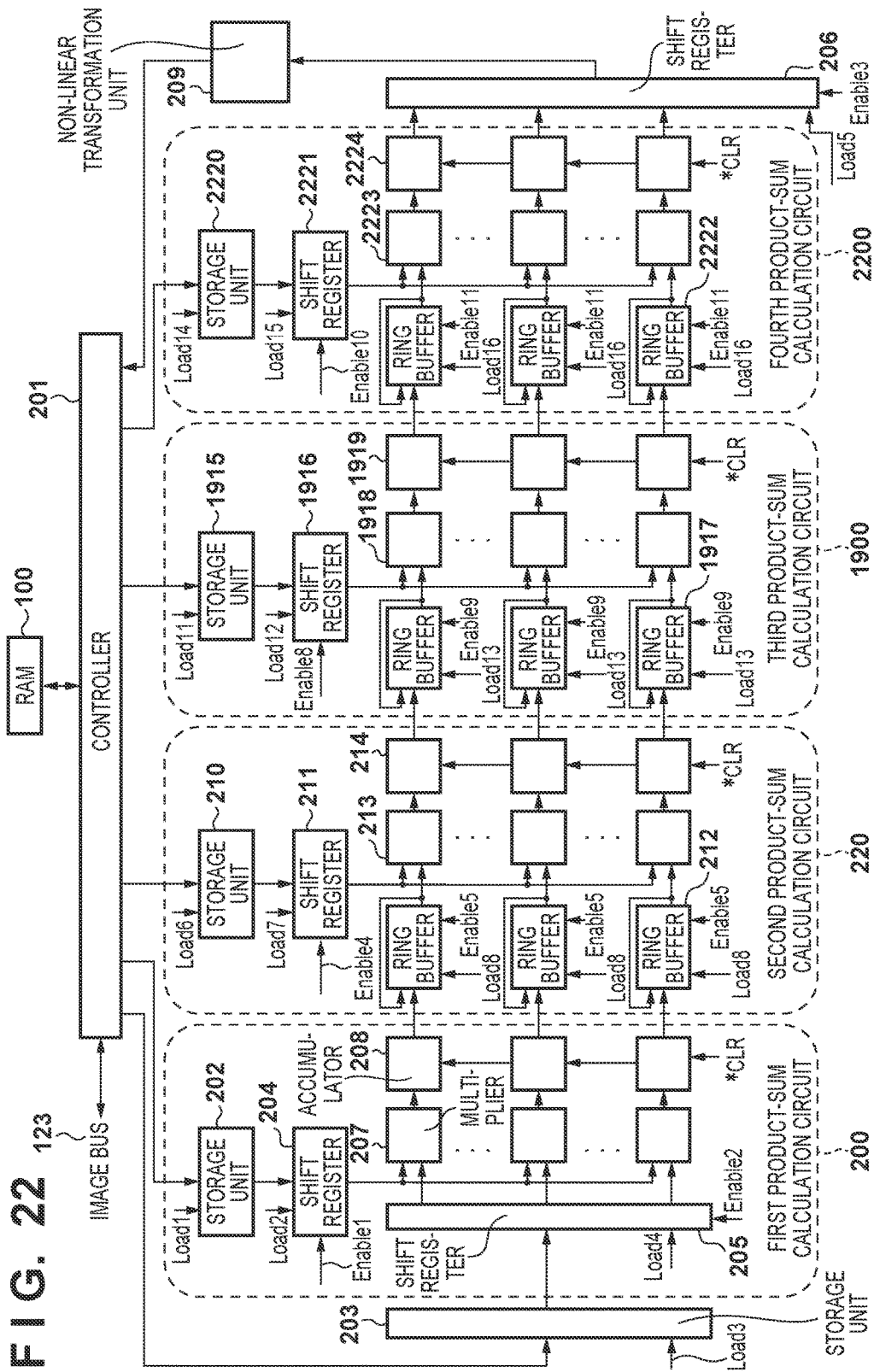
FIG. 22 is a block diagram for explaining the arrangement of a CNN processing unit according to the fifth embodiment.

FIG. 22 is a block diagram for explaining the arrangement of a CNN processing unit 122 according to the fifth embodiment. In this example, a fourth product-sum calculation circuit 2200 is subsequently series-connected to the third product-sum calculation circuit 1900. The fourth product-sum calculation circuit 2200 has the same arrangement as that of the second product-sum calculation circuit 220 and a description thereof will be omitted. That is, components denoted by reference numerals 2220 to 2224 of the fourth product-sum calculation circuit 2200 are the same as those denoted by reference numerals 210 to 214 of the second product-sum calculation circuit 220, respectively.

A convolution operation according to the fifth embodiment will be described next. In convolution operation processing according to the fifth embodiment, a convolution operation is executed for a plurality of time-series reference data (image data). That is, a convolution operation of reference data is executed by decomposing a plurality of filter kernels respectively having two-dimensional structures and respectively corresponding to a plurality of feature planes into four kernels respectively having one-dimensional structures in the horizontal, vertical, feature plane, and time directions. It is generally known that the weighting coefficient matrix of a kernel having a four-dimensional structure (horizontal, vertical, feature plane, and time directions) can be approximated by multiplication using kernels respectively having one-dimensional structures in the horizontal, vertical, feature plane, and time directions, given by:

$$output(x, y) = \sum_{timeIndex=0}^{timeSize-1} \sum_{featureIndex=0}^{featureSize-1} \sum_{row=0}^{rowSize-1} \sum_{column=0}^{columnSize-1} (input(x + column, y + row, feature, time) \times weight_{horizontal}(column) \times weight_{vertical}(row) \times weight_{feature}(featureIndex) \times weight_{time}(timeIndex)) \quad (6)$$

Note that in fact, a method is often used in which the approximation accuracy is improved by obtaining the total of multiplication results using the combination of the filter kernels in the horizontal, vertical, feature plane, and time directions, given by:

$$output(x, y) = \sum_{pair=0}^{pairSize-1} \sum_{timeIndex=0}^{timeSize-1} \sum_{featureIndex=0}^{featureSize-1} \sum_{row=0}^{rowSize-1} \sum_{column=0}^{columnSize-1} (input(x + column, y + row, feature, time) \times weight_{pair,horizontal}(column) \times weight_{pair,vertical}(row) \times weight_{pair,feature}(featureIndex) \times weight_{pair,time}(timeIndex)) \quad (7)$$

where a subscript "pair" represents the combination of the filter kernels.

The method is described in detail in Denton and a more detailed description will be omitted.

In a convolution operation method for executing equations (6) and (7), operation processing in the first product-sum calculation circuit 200, that in the second product-sum calculation circuit 220, and that in the third product-sum calculation circuit 1900 are the same as in the fourth embodiment. Furthermore, operation processing in the fourth product-sum calculation circuit 2200 is the same as that in the third product-sum calculation circuit 1900 described in the fourth embodiment and a description thereof will be omitted.

As described above, according to the fifth embodiment, an operation and memory access can be implemented by pipeline processing for each filter kernel size by a small circuit scale (register size or the like). It is then possible to execute, at high speed, a hierarchical convolution operation by decomposing the kernel having the four-dimensional structure into the four filter kernels respectively having the one-dimensional structures in the horizontal, vertical, feature plane, and time directions. Since the reference data and operation result data are arranged in the same memory space, it is possible to flexibly perform a complicated hierarchical convolution operation processing by only register setting.

In this way, it is possible to execute a hierarchical convolution operation at high speed with a low cost, thereby reducing the power consumption. It is also possible to execute a convolution operation including various hierarchical connections at high speed by the same circuit.

As can be readily analogized from the fifth and fourth embodiments, when the number of filter kernels respectively having one-dimensional structures is further increased, it is possible to execute a convolution operation in the same way as in the first to fifth embodiments by series-connecting a corresponding product-sum calculation circuit.

The circuit arrangement described in each of the first to fifth embodiments is merely an example of the convolution operation apparatus according to the present invention. Any circuit arrangement may be adopted as long as it can implement the same functions. For example, the ring buffers 212 in the second product-sum calculation circuit 220 are not limited to the circuit arrangement described above. For example, any circuit arrangement may be adopted as long as a storage device has a function capable of repeatedly referring to data input in the past and sequentially referring to held data.

Modification 1

In the CNN processing unit according to each of the above-described first to fifth embodiments, the first product-sum calculation circuit 200 can execute the same operation as that in Japanese Patent No. 5376920. In this case, for example, it is possible to implement the same operation by directly outputting data input from the first product-sum calculation circuit 200 without performing a substantial operation in the second product-sum calculation circuit 220. Alternatively, the output from the first product-sum calculation circuit 200 may be directly input to the shift register 206 according to the first embodiment by bypassing the second product-sum calculation circuit 220.

If the same operation as that in Japanese Patent No. 5376920 is executed, for example, filter operation processing using a filter kernel having a two-dimensional structure intact can be executed. This can avoid accuracy deterioration caused by approximation which can occur when decomposing the filter kernel into filter kernels respectively having one-dimensional structures.

Modification 2

Although each of the above-described embodiments 1 to 5 has explained an example in which the CNN processing unit according to each embodiment executes CNN operation processing, executable operation processing is not limited to this. That is, for example, a general filter operation can be executed as long as a convolution operation indicated by equations (2) to (7) is executed. The present invention is not intended to limit operation processing to be executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-207499, filed Oct. 21, 2015, which is hereby incorporated by reference herein in its entirety.

What is claimed is:

1. A convolution operation apparatus, which recognizes a target in an input image data, comprising:
  a first product-sum calculator including:
    a plurality of first multipliers each configured to multiply data input to a first input and a second input;
    a plurality of first accumulators each configured to accumulate a multiplication result from a corresponding one of the plurality of first multipliers;
    a first data supplier configured to supply the input image data as first data to the first input of each of the plurality of first multipliers; and
    a second data supplier configured to supply a plurality of second data to respective second inputs of the plurality of first multipliers;
  a second product-sum calculator including:
    a plurality of second multipliers each configured to multiply data input to a first input and a second input;
    a plurality of second accumulators each configured to accumulate a multiplication result from a corresponding one of the plurality of second multipliers;
    a third data supplier configured to supply third data to the first input of each of the plurality of second multipliers; and
    a fourth data supplier configured to receive and hold an output from each of the plurality of first accumulators and supply the output as fourth data to the second input of a corresponding one of the plurality of second multipliers; and
  a controller configured to control the first product-sum calculator and the second product-sum calculator to parallelly execute product-sum processing,
  wherein the second product-sum calculator provides the outputs from the plurality of second accumulators as results of convolution operations to the second data using the first data and the third data, and the target in the input image data is recognized based on the results of convolution operations, and
  wherein the number of the plurality of first multipliers, the number of the plurality of first accumulators, the number of the plurality of second multipliers, and the number of the plurality of second accumulators correspond to a size of a filter kernel.

2. The apparatus according to claim 1, wherein the first data and the third data are coefficient data of the filter kernel, and the plurality of second data are image data in a horizontal direction obtained by a raster scan.

3. The apparatus according to claim 1, wherein the number of the plurality of first multipliers and the number of the plurality of first accumulators are equal to the number of the plurality of second multipliers and the number of the plurality of second accumulators.

4. The apparatus according to claim 2, wherein the controller is further configured to insert, to the product-sum calculation processing by the first product-sum calculator, a stall stage according to a difference between a size of the filter kernel in a horizontal direction and a size of the filter kernel in a vertical direction, when the size of the filter kernel in the horizontal direction is different from the size of the filter kernel in the vertical direction.

5. The apparatus according to claim 1, further comprising:
  a third product-sum calculator subsequently series-connected to the second product-sum calculator and having the same arrangement as that of the second product-sum calculator,
  wherein the third product-sum calculator includes a data supplier corresponding to the fourth data supplier of the second product-sum calculator and multipliers corresponding to the plurality of second multipliers of the second product-sum calculator, and the data supplier of the third product-sum calculator is configured to receive and hold an output from each of the plurality of second accumulators of the second product-sum calculator, and supply the output as fourth data to a second input of a corresponding one of the multipliers of the third product-sum calculator.

6. The apparatus according to claim 5, further comprising:
  a fourth product-sum calculator subsequently series-connected to the third product-sum calculator and having the same arrangement as that of the third product-sum calculator,
  wherein the fourth product-sum calculator includes a data supplier corresponding to the fourth data supplier of the second product-sum calculator and multipliers corresponding to the plurality of second multipliers of the second product-sum calculator, and the data supplier of the fourth product-sum calculator is configured to receive and hold an output from each of a plurality of accumulators of the third product-sum calculator, and supply the output as fourth data to a second input of a corresponding one of the multipliers of the fourth product-sum calculator.

7. A convolution operation apparatus comprising:
a first product-sum calculator including:
   a plurality of first multipliers each configured to multiply data input to a first input and a second input;
   a plurality of first accumulators each configured to accumulate a multiplication result from a corresponding one of the plurality of first multipliers;
   a first data supplier configured to supply first data to the first input of each of the plurality of first multipliers; and
   a second data supplier configured to supply a plurality of second data to respective second inputs of the plurality of first multipliers; and
a second product-sum calculator including:
   a plurality of second multipliers each configured to multiply data input to a first input and a second input,
   a plurality of second accumulators each configured to accumulate a multiplication result from a corresponding one of the plurality of second multipliers;
   a third data supplier configured to supply third data to the first input of each of the plurality of second multipliers; and
   a fourth data supplier configured to supply fourth data to the second input of a corresponding one of the plurality of second multipliers; and
a controller configured to control the first product-sum calculator and the second product-sum calculator,
wherein the first product-sum calculator is subsequently connected to the second product-sum calculator, the fourth data supplier is further configured to loads necessary reference data into ring buffers at once for each filter kernel, shift the loaded reference data in a ring in response to an operation clock, and supply the shifted reference data as the fourth data, and the second data supplier supplies, as the plurality of second data, outputs from the plurality of second accumulators to the second inputs of the plurality of first multipliers, and wherein the number of the plurality of first multipliers, the number of the plurality of first accumulators, the number of the plurality of second multipliers, and the number of the plurality of second accumulators correspond to a size of a filter kernel.

8. The apparatus according to claim 1, further comprising:
a non-linear transformer configured to perform non-linear transformation to the outputs from the plurality of second accumulators.

9. The apparatus according to claim 1, wherein
the first data supplier parallelly supplies common first data to the first inputs of the plurality of first multipliers, and
the second data supplier parallelly supplies different second data to the second inputs of the plurality of first multipliers.

10. The apparatus according to claim 9, wherein the second data supplier is further configured to supply the second data, which was supplied to the second input of one of the plurality of first multipliers at a given timing, to the second input of another one of the plurality of first multipliers at another timing.

11. The apparatus according to claim 1, wherein
the third data supplier parallelly supplies common third data to the first inputs of the plurality of second multipliers, and
the fourth data supplier parallelly supplies different fourth data to the second inputs of the plurality of second multipliers.

12. The apparatus according to claim 11, wherein the fourth data supplier supplies the fourth data, which was supplied to the second input of one of the plurality of second multipliers at a given timing, to the second input of the same one of the plurality of second multipliers at another timing.

* * * * *